(12) United States Patent
Zhao et al.

(10) Patent No.: US 12,743,013 B2
(45) Date of Patent: Sep. 22, 2026

(54) CAMERA MODULE

(71) Applicant: NINGBO SUNNY OPOTECH CO., LTD, Yuyao (CN)

(72) Inventors: Bojie Zhao, Yuyao (CN); Linmin Ye, Yuyao (CN); Jiayao Que, Yuyao (CN); Zhen Huang, Yuyao (CN); Yinli Fang, Yuyao (CN); Chao Hong, Yuyao (CN); Qiang Fu, Yuyao (CN); Dongli Yuan, Yuyao (CN)

(73) Assignee: NINGBO SUNNY OPOTECH CO., LTD., Yuyao (CN)

( * ) Notice: Subject to any disclaimer, the term of this patent is extended or adjusted under 35 U.S.C. 154(b) by 439 days.

(21) Appl. No.: 18/288,707

(22) PCT Filed: Apr. 12, 2022

(86) PCT No.: PCT/CN2022/086333
§ 371 (c)(1),
(2) Date: Oct. 27, 2023

(87) PCT Pub. No.: WO2022/228111
PCT Pub. Date: Nov. 3, 2022

(65) Prior Publication Data

US 2024/0210811 A1 Jun. 27, 2024

(30) Foreign Application Priority Data

Apr. 30, 2021 (CN) ......................... 202110482636.4
Apr. 30, 2021 (CN) ......................... 202110482664.6

(51) Int. Cl.

| | |
|---|---|
| ***G03B 30/00*** | (2021.01) |
| ***G02B 7/02*** | (2021.01) |
| ***G03B 5/00*** | (2021.01) |

(52) U.S. Cl.
CPC ............ *G03B 30/00* (2021.01); *G02B 7/023* (2013.01); *G03B 5/00* (2013.01); *G03B 2205/0015* (2013.01); *G03B 2205/0061* (2013.01)

(58) Field of Classification Search
CPC ... G02B 7/09; G02B 7/04; G02B 7/08; G02B 7/102; G03B 5/00; G03B 5/04;
(Continued)

(56) References Cited

U.S. PATENT DOCUMENTS 10,367,432 B2 7/2019 Takahashi
2001/0004420 A1 6/2001 Kuwana et al.
(Continued)

FOREIGN PATENT DOCUMENTS

CN 101067709 A 11/2007
CN 101507094 A 8/2009
(Continued)

OTHER PUBLICATIONS

European Search Report for European Application No. 22794582.1, dated Aug. 14, 2024.
(Continued)

*Primary Examiner* — Ephrem Z Mebrahtu
(74) *Attorney, Agent, or Firm* — Birch, Stewart, Kolasch & Birch, LLP

(57) ABSTRACT

A camera module, including: a photosensitive assembly; a lens assembly held on a photosensitive path of the photosensitive assembly, wherein the lens assembly is provided with an optical axis; and a driving assembly, including a first carrying frame, a first driving element and a first prepressing component, wherein the photosensitive assembly is mounted to the first carrying frame, and the first driving element is designed as a piezoelectric actuator, and wherein the first driving element is frictionally coupled to the first carrying
(Continued)

frame through the first prepressing component, and is configured to, after being driven, move in a two-dimensional trajectory in a plane perpendicular to the optical axis in a manner of bending vibration along two directions, and thereby drive the first carrying frame by friction to bring the photosensitive assembly to move in a first direction in the plane perpendicular to the optical axis for optical image stabilization.

16 Claims, 20 Drawing Sheets

(58) Field of Classification Search
CPC .......... G03B 13/34; G03B 13/36; G03B 3/10; H04N 23/60; H04N 23/50; H04N 23/55; H04N 23/687
See application file for complete search history.

(56) References Cited

U.S. PATENT DOCUMENTS

2010/0171392 A1 7/2010 Mukae
2011/0141584 A1* 6/2011 Henderson ............ G02B 7/022 359/896
2012/0182436 A1 7/2012 Hu et al.
2016/0161828 A1 6/2016 Lee
2017/0017058 A1 1/2017 Sumioka
2017/0257544 A1 9/2017 Hsu et al.
2023/0296963 A1* 9/2023 Li ........................... G03B 5/00 359/557

FOREIGN PATENT DOCUMENTS

CN 102177597 A 9/2011
CN 109889083 A 6/2019
CN 110199216 A 9/2019
CN 111474671 A 7/2020
CN 211266959 U 8/2020
CN 111880278 A 11/2020
CN 212135043 U 12/2020
CN 117501176 A 2/2024
JP 2000-307937 A 11/2000
JP 2011-227427 A 11/2011
JP 2020-170088 A 10/2020
WO WO 2015/001952 A1 1/2015

OTHER PUBLICATIONS

International Search Report (PCT/ISA/210) issued in PCT/CN2022/086333, dated Jun. 27, 2022.

* cited by examiner 100
110
111
112
1115
1114
1116
1118
1117
D
H 100
110
111
43 (46)
112

CAMERA MODULE

CROSS REFERENCE TO RELATED APPLICATIONS

This application is a national stage application under 35 U.S.C. § 371 to International PCT Application PCT/CN2022/086333, entitled "CAMERA MODULE", filed Apr. 12, 2022, which claims priority to and benefit of China Patent Application No. 202110482664.6, filed Apr. 30, 2021, and China Patent Application No. 202110482636.4, filed Apr. 30, 2021. All of the above-referenced applications are incorporated into the present application by reference herein in their entirety.

TECHNICAL FIELD

The present disclosure relates to a camera module, and in particular, to a camera module which uses a new piezoelectric actuator as a driving element to meet the requirement of the camera module for optical image stabilization. Moreover, the piezoelectric actuator is arranged in the camera module in a rational arrangement scheme, so as to meet the structural and dimensional requirements of the camera module.

TECHNICAL BACKGROUND

With the popularity of mobile electronic devices, the related technologies of camera modules for helping users obtain images (such as, videos or images) used in the mobile electronic devices have been developed and advanced rapidly, and in recent years, the camera modules have been widely applied in many fields such as medical treatment, security and industrial production.

In order to meet the increasingly widespread market demands, high pixels, large chips and small sizes are irreversible development trends of the existing camera modules. With the development of photosensitive chips in the direction of high pixels and large chips, the size of optical components (such as filter elements, and optical camera lenses) that are compatible with photosensitive chips is also gradually increasing, which brings new challenges to driving elements used to drive the optical components for optical performance adjustment (e.g., optical focus, optical image stabilization, etc.).

Specifically, existing driving elements for driving optical components are electromagnetic motors, such as Voice Coil Motors (VCM), Shape Memory Alloy Actuators (SMA), etc. However, as the size of optical components increases, resulting in an increase in weight, the existing electromagnetic motors are gradually unable to provide sufficient driving force to drive the optical components to move. Quantitatively, existing voice coil motors and shape memory alloy drivers are only suitable for driving an optical component with a weight less than 100 mg. That is, if the weight of the optical component exceeds 100 mg, the existing drivers will not be able to meet the application requirements of camera modules.

In addition, as mobile terminal devices are becoming smaller and thinner, the density of component layout inside the driving element has also increased. Correspondingly, the existing voice coil motor is internally provided with a coil and magnets. When the distance between two magnets is too close (less than 7 mm), their internal magnetic fields will interact with each other, resulting in displacement or vibration of the magnets, and reducing the stability of its drive control.

Therefore, an adapted new driving solution for camera modules is needed. The new driver can not only meet the driving requirements of the camera module for optical performance adjustment, but also meet the development requirements of lightness and thinness of the camera module.

SUMMARY

An advantage of the present disclosure is to provide a camera module, wherein the camera module uses a new piezoelectric actuator as a driving element so that it can not only provide sufficient driving force, but also provide driving performance with higher accuracy and a longer stroke, so as to meet the demands of the camera module for optical performance adjustment, for example, the demands for optical image stabilization.

Another advantage of the present disclosure is to provide a camera module, wherein the piezoelectric actuator has a relatively small size to better adapt to the development tendency of the camera modules for lightness and thinness.

Another advantage of the present disclosure is to provide a camera module, wherein the piezoelectric actuator is arranged in the camera module in a rational arrangement scheme to meet the structure and size requirements of the camera module.

Through the following description, other advantages and features of the present disclosure will become apparent, and can be realized by means and combinations particularly pointed out in the claims.

In order to achieve at least one of the advantages described above, the present disclosure provides a camera module, comprising:

- a photosensitive assembly, comprising a circuit board and a photosensitive chip electrically connected to the circuit board;
- a lens assembly held on a photosensitive path of the photosensitive assembly, comprising a lens carrier and an optical camera lens mounted on the lens carrier, wherein the optical camera lens is provided with an optical axis; and
- a driving assembly, comprising a first carrying frame, a first driving element and a first prepressing component, wherein the photosensitive assembly is mounted to the first carrying frame, and the first driving element is designed as a piezoelectric actuator, and wherein the first driving element is frictionally coupled to the first carrying frame through the first prepressing component, and is configured to, after being driven, move along a first direction in a two-dimensional trajectory in a plane perpendicular to the optical axis in a manner of bending vibration along two directions, and thereby drive the first carrying frame by friction, so as to bring the photosensitive assembly to move in the first direction in the plane perpendicular to the optical axis for optical image stabilization.

In the camera module according to the present disclosure, the driving assembly further comprises a second carrying frame, a second driving element and a second prepressing component, wherein the second carrying frame is externally arranged on the first carrying frame, and the second driving element is designed as a piezoelectric actuator, and wherein the second driving element is frictionally coupled to the second carrying frame through the second prepressing component, and is configured to, after being driven, move along a second direction in a two-dimensional trajectory in a plane perpendicular to the optical axis in a manner of bending vibration along two directions, and thereby drive the second carrying frame by friction, so as to bring the first carrying frame to bring the photosensitive assembly to move in the second direction in the plane perpendicular to the optical axis for optical image stabilization, the first direction being perpendicular to the second direction.

In the camera module according to the present disclosure, the piezoelectric actuator comprises an actuating system and a driving circuit system, wherein the actuating system moves in a two-dimensional trajectory along a preset direction in a manner of bending vibration along two directions under the control of the driving circuit system.

In the camera module according to the present disclosure, the actuating system comprises a piezoelectric plate structure and a friction driving portion fixed to the piezoelectric plate structure, and the friction driving portion is frictionally coupled to the first carrying frame or the second carrying frame.

In the camera module according to the present disclosure, the piezoelectric plate structure has a first side surface extending along its depth direction and a second side surface extending along its height direction and adjacent to the first side surface, wherein the piezoelectric plate structure has a first resonance frequency along its depth direction and a second resonance frequency along its height direction, and wherein the second resonance frequency is greater than the first resonance frequency.

In the camera module according to the present disclosure, the piezoelectric plate structure comprises a first piezoelectric region, a second piezoelectric region and a third piezoelectric region formed on the second side surface, and a fourth piezoelectric region formed on the first side surface, wherein the second piezoelectric region is located between the first piezoelectric region and the third piezoelectric region, and the fourth piezoelectric region is adjacent to the second piezoelectric region; and wherein the piezoelectric plate structure further comprises a first electrode pair electrically connected to the first piezoelectric region, a second electrode pair electrically connected to the second piezoelectric region, a third electrode pair electrically connected to the third piezoelectric region, and a fourth electrode pair electrically connected to the fourth electrical connection region.

In the camera module according to the present disclosure, the driving circuit system comprises a first driving circuit and a second driving circuit, the first driving circuit is electrically connected to the first electrode pair and the third electrode pair, and the second driving circuit is electrically connected to the second electrode pair and the fourth electrode pair; and wherein vibration frequencies of circuit vibration signals output by the first driving circuit and the second driving circuit are equal to the first resonance frequency or the second resonance frequency.

In the camera module according to the present disclosure, when the vibration frequency of the circuit vibration signal output by the first driving circuit is the first resonance frequency, the piezoelectric plate structure resonates in its height direction and partially resonates in its depth direction, so that the piezoelectric plate structure moves in a two-dimensional trajectory along a preset direction in a manner of bending vibration along two directions; and wherein when a vibration frequency of a circuit vibration signal input by the second driving circuit is the second resonance frequency, the piezoelectric plate structure resonates in its depth direction and partially resonates in its height direction, so that the piezoelectric plate structure moves in a two-dimensional trajectory along a preset direction in a manner of bending vibration along two directions.

In the camera module according to the present disclosure, the driving assembly further comprises a first friction actuating portion and a second friction actuating portion, and the first friction actuating portion is sandwiched between the first driving element and the first carrying frame, so that the first driving element is frictionally coupled to the first carrying frame through the first friction actuating portion and the first prepressing component; and the second friction actuating portion is sandwiched between the second driving element and the second carrying frame, so that the second driving element is frictionally coupled to the second carrying frame through the second prepressing component and the second friction actuating portion.

In the camera module according to the present disclosure, the first driving element is located on a side part of the first carrying frame.

In the camera module according to the present disclosure, the first driving element is located on an upper part of the first carrying frame.

In the camera module according to the present disclosure, the first driving element is located on a lower part of the first carrying frame.

In the camera module according to the present disclosure, the driving assembly further comprises an outer frame externally arranged on the second carrying frame, wherein the second driving element is sandwiched between the second carrying frame and the outer frame through the second prepressing component and the second friction actuating portion, so that the second driving element is frictionally coupled to the second carrying frame, and wherein the second driving element is located on a side part of the second carrying frame.

In the camera module according to the present disclosure, the driving assembly further comprises an outer frame externally arranged on the second carrying frame, wherein the second driving element is sandwiched between the second carrying frame and the lens carrier through the second prepressing component and the second friction actuating portion, so that the second driving element is frictionally coupled to the second carrying frame, and wherein the second driving element is located on an upper part of the second carrying frame.

In the camera module according to the present disclosure, the driving assembly further comprises an outer frame externally arranged on the second carrying frame, wherein the second driving element is sandwiched between the second carrying frame and the outer frame through the second prepressing component and the second friction actuating portion, so that the second driving element is frictionally coupled to the second carrying frame, and wherein the second driving element is located on a lower part of the second carrying frame.

In the camera module according to the present disclosure, the driving assembly further comprises a first guiding mechanism arranged between the first carrying frame and the second carrying frame, and a second guiding mechanism arranged between the second carrying frame and the outer frame.

In the camera module according to the present disclosure, the driving assembly further comprises a first guiding mechanism arranged between the first carrying frame and the second carrying frame, and a second guiding mechanism between the second carrying frame and the lens carrier.

In the camera module according to the present disclosure, the driving assembly further comprises a first guiding mechanism arranged between the first carrying frame and the second carrying frame, and a second guiding mechanism arranged between the second carrying frame and the outer frame.

In the camera module according to the present disclosure, the first prepressing component comprises a first elastic element, and the first elastic element is arranged between the piezoelectric plate structure of the first driving element and the second carrying frame, so as to force the friction driving portion of the first driving element to be abutted against the first friction actuating portion by means of an elastic force of the first elastic element, so that the first driving element is frictionally coupled to the first carrying frame; and the second prepressing element comprises a second elastic element, and the second elastic element is arranged between the piezoelectric plate structure of the second driving element and the outer frame, so as to force the friction driving portion of the second driving element to be abutted against the second friction actuating portion by means of an elastic force of the second elastic element, so that the second driving element is frictionally coupled to the second carrying frame.

In the camera module according to the present disclosure, the first prepressing component comprises a first elastic element, and the first elastic element is arranged between the piezoelectric plate structure of the first driving element and the second carrying frame, so as to force the friction driving portion of the first driving element to be abutted against the first friction actuating portion by means of an elastic force of the first elastic element, so that the first driving element is frictionally coupled to the first carrying frame; and the second prepressing element comprises a second elastic element, and the second elastic element is arranged between the piezoelectric plate structure of the second driving element and the lens carrier, so as to force the friction driving portion of the second driving element to be abutted against the second friction actuating portion by means of an elastic force of the second elastic element, so that the second driving element is frictionally coupled to the second carrying frame.

In the camera module according to the present disclosure, the first prepressing component comprises a first elastic element, and the first elastic element is arranged between the piezoelectric plate structure of the first driving element and the second carrying frame, so as to force the friction driving portion of the first driving element to be abutted against the first friction actuating portion by means of an elastic force of the first elastic element, so that the first driving element is frictionally coupled to the first carrying frame; and the second prepressing element comprises a second elastic element, and the second elastic element is arranged between the piezoelectric plate structure of the second driving element and the outer frame, so as to force the friction driving portion of the second driving element to be abutted against the second friction actuating portion by means of an elastic force of the second elastic element, so that the second driving element is frictionally coupled to the second carrying frame.

In the camera module according to the present disclosure, the first elastic element and the second elastic element are designed as adhesives having elasticity.

In the camera module according to the present disclosure, thickness dimensions of the first elastic element and the second elastic element are between 10 um and 50 um.

In the camera module according to the present disclosure, the first prepressing component comprises a first magnetic attraction element arranged on the first carrying frame and a second magnetic attraction element arranged on the second carrying frame and corresponding to the first magnetic attraction element, so as to force the friction driving portion of the first driving element to be abutted against the first friction actuating portion by means of a magnetic attraction effect between the first magnetic attraction element and the second magnetic attraction element, so that the first driving element is frictionally coupled to the first carrying frame; and the second prepressing component comprises a third magnetic attraction element arranged on the second carrying frame and a fourth magnetic attraction element arranged on the outer frame and corresponding to the third magnetic attraction element, so as to force the friction driving portion of the second driving element to be abutted against the second friction actuating portion by means of a magnetic attraction effect between the third magnetic attraction element and the fourth magnetic attraction element, so that the second driving element is frictionally coupled to the second carrying frame.

In the camera module according to the present disclosure, the first prepressing component comprises a first magnetic attraction element arranged on the first carrying frame and a second magnetic attraction element arranged on the second carrying frame and corresponding to the first magnetic attraction element, so as to force the friction driving portion of the first driving element to be abutted against the first friction actuating portion by means of a magnetic attraction effect between the first magnetic attraction element and the second magnetic attraction element, so that the first driving element is frictionally coupled to the first carrying frame; and the second prepressing component comprises a third magnetic attraction element arranged on the second carrying frame and a fourth magnetic attraction element arranged on the lens carrier and corresponding to the third magnetic attraction element, so as to force the friction driving portion of the second driving element to be abutted against the second friction actuating portion by means of a magnetic attraction effect between the third magnetic attraction element and the fourth magnetic attraction element, so that the second driving element is frictionally coupled to the second carrying frame.

In the camera module according to the present disclosure, the first prepressing component comprises a first magnetic attraction element arranged on the first carrying frame and a second magnetic attraction element arranged on the second carrying frame and corresponding to the first magnetic attraction element, so as to force the friction driving portion of the first driving element to be abutted against the first friction actuating portion by means of a magnetic attraction effect between the first magnetic attraction element and the second magnetic attraction element, so that the first driving element is frictionally coupled to the first carrying frame; and the second prepressing component comprises a third magnetic attraction element arranged on the second carrying frame and a fourth magnetic attraction element arranged on the outer frame and corresponding to the third magnetic attraction element, so as to force the friction driving portion of the second driving element to be abutted against the second friction actuating portion by means of a magnetic attraction effect between the third magnetic attraction element and the fourth magnetic attraction element, so that the second driving element is frictionally coupled to the second carrying frame.

According to another aspect of the present disclosure, the present disclosure provides a camera module, comprising:

a photosensitive assembly, comprising a circuit board and a photosensitive chip electrically connected to the circuit board;

a frame carrier assembly mounted to the photosensitive assembly, wherein the frame carrier assembly comprises a first frame carrier;

an optical camera lens held on a photosensitive path of the photosensitive assembly by being mounted in the first frame carrier, wherein the optical camera lens is provided with an optical axis; and a driving assembly, comprising a first driving element and a first prepressing component, wherein the first driving element is designed as a piezoelectric actuator, and wherein the first driving element is frictionally coupled to the first frame carrier through the first prepressing component, and is configured to, after being driven, move in a two-dimensional trajectory in a plane perpendicular to the optical axis in a manner of bending vibration along two directions, and thereby drive the first frame carrier by friction, so as to bring the optical camera lens to move in a first direction perpendicular to the optical axis.

In the camera module according to the present disclosure, the frame assembly further comprises a second frame carrier externally arranged on the first frame carrier and an outer frame carrier externally arranged on the second frame carrier, wherein the driving assembly further comprises a second driving element and a second prepressing component, and the second driving element is designed as a piezoelectric actuator, and wherein the second driving element is frictionally coupled to the second frame carrier through the second prepressing component, and is configured to, after being driven, move in a two-dimensional trajectory in a plane perpendicular to the optical axis in a manner of bending vibration along two directions, and thereby drive the second frame carrier by friction, so as to bring the first frame carrier to bring the optical camera lens to move in a second direction perpendicular to the optical axis, the second direction being perpendicular to the first direction.

In the camera module according to the present disclosure, the piezoelectric actuator comprises an actuating system and a driving circuit system, wherein the actuating system moves in a two-dimensional trajectory along a preset direction in a manner of bending vibration along two directions under the control of the driving circuit system.

In the camera module according to the present disclosure, the actuating system comprises a piezoelectric plate structure and a friction driving portion fixed to the piezoelectric plate structure, and the friction driving portion is frictionally coupled to the first frame carrier or the second frame carrier.

In the camera module according to the present disclosure, the piezoelectric plate structure has a first side surface extending along its depth direction and a second side surface extending along its height direction and adjacent to the first side surface, wherein the piezoelectric plate structure has a first resonance frequency along its depth direction and a second resonance frequency along its height direction, and wherein the second resonance frequency is greater than the first resonance frequency.

In the camera module according to the present disclosure, the piezoelectric plate structure comprises a first piezoelectric region, a second piezoelectric region and a third piezoelectric region formed on the second side surface, and a fourth piezoelectric region formed on the first side surface, wherein the second piezoelectric region is located between the first piezoelectric region and the third piezoelectric region, and the fourth piezoelectric region is adjacent to the second piezoelectric region; and wherein the piezoelectric plate structure further comprises a first electrode pair electrically connected to the first piezoelectric region, a second electrode pair electrically connected to the second piezoelectric region, a third electrode pair electrically connected to the third piezoelectric region, and a fourth electrode pair electrically connected to the fourth electrical connection region.

In the camera module according to the present disclosure, the driving circuit system comprises a first driving circuit and a second driving circuit, the first driving circuit is electrically connected to the first electrode pair and the third electrode pair, and the second driving circuit is electrically connected to the second electrode pair and the fourth electrode pair; and wherein vibration frequencies of circuit vibration signals output by the first driving circuit and the second driving circuit are equal to the first resonance frequency or the second resonance frequency.

In the camera module according to the present disclosure, when the vibration frequency of the circuit vibration signal output by the first driving circuit is the first resonance frequency, the piezoelectric plate structure resonates in its height direction and partially resonates in its depth direction, so that the piezoelectric plate structure moves in a two-dimensional trajectory along a preset direction in a manner of bending vibration along two directions; and wherein when a vibration frequency of a circuit vibration signal input by the second driving circuit is the second resonance frequency, the piezoelectric plate structure resonates in its depth direction and partially resonates in its height direction, so that the piezoelectric plate structure moves in a two-dimensional trajectory along a preset direction in a manner of bending vibration along two directions.

In the camera module according to the present disclosure, the driving assembly further comprises a first friction actuating portion and a second friction actuating portion, and the first friction actuating portion is sandwiched between a friction driving portion of the first driving element and the first frame carrier, so that the first driving element is frictionally coupled to the first frame carrier through the first friction actuating portion and the first prepressing component; and the second friction actuating portion is sandwiched between a friction driving portion of the second driving element and the second frame carrier, so that the second driving element is frictionally coupled to the second frame carrier through the second prepressing component and the second friction actuating portion.

In the camera module according to the present disclosure, the first driving element is located on a side part of the first frame carrier.

In the camera module according to the present disclosure, the first driving element is located on an upper part of the first frame carrier.

In the camera module according to the present disclosure, the first driving element is located on a lower part of the first frame carrier.

In the camera module according to the present disclosure, the second driving element is sandwiched between the second frame carrier and the outer frame carrier through the second prepressing component and the second friction actuating portion, so that the second driving element is frictionally coupled to the second frame carrier, and wherein the second driving element is located on a side part of the second frame carrier.

In the camera module according to the present disclosure, the second driving element is sandwiched between the second frame carrier and the lens carrier through the second prepressing component and the second friction actuating portion, so that the second driving element is frictionally coupled to the second frame carrier, and wherein the second driving element is located on an upper part of the second frame carrier.

In the camera module according to the present disclosure, the driving assembly further comprises an outer frame carrier externally arranged on the second frame carrier, wherein the second driving element is sandwiched between the second frame carrier and the outer frame carrier through the second prepressing component and the second friction actuating portion, so that the second driving element is frictionally coupled to the second frame carrier, and wherein the second driving element is located on a low part of the second frame carrier.

In the camera module according to the present disclosure, the first prepressing component comprises a first elastic element, and the first elastic element is arranged between the piezoelectric plate structure of the first driving element and the second frame carrier, so as to force the friction driving portion of the first driving element to be abutted against the first friction actuating portion by means of an elastic force of the first elastic element, so that the first driving element is frictionally coupled to the first frame carrier; and the second prepressing element comprises a second elastic element, and the second elastic element is arranged between the piezoelectric plate structure of the second driving element and the outer frame carrier, so as to force the friction driving portion of the second driving element to be abutted against the second friction actuating portion by means of an elastic force of the second elastic element, so that the second driving element is frictionally coupled to the second frame carrier.

In the camera module according to the present disclosure, the first prepressing component comprises a first elastic element, and the first elastic element is arranged between the piezoelectric plate structure of the first driving element and the second frame carrier, so as to force the friction driving portion of the first driving element to be abutted against the first friction actuating portion by means of an elastic force of the first elastic element, so that the first driving element is frictionally coupled to the first frame carrier; and the second prepressing element comprises a second elastic element, and the second elastic element is arranged between the piezoelectric plate structure of the second driving element and the lens carrier, so as to force the friction driving portion of the second driving element to be abutted against the second friction actuating portion by means of an elastic force of the second elastic element, so that the second driving element is frictionally coupled to the second frame carrier.

In the camera module according to the present disclosure, the first prepressing component comprises a first elastic element, and the first elastic element is arranged between the piezoelectric plate structure of the first driving element and the second frame carrier, so as to force the friction driving portion of the first driving element to be abutted against the first friction actuating portion by means of an elastic force of the first elastic element, so that the first driving element is frictionally coupled to the first frame carrier; and the second prepressing element comprises a second elastic element, and the second elastic element is arranged between the piezoelectric plate structure of the second driving element and the outer frame carrier, so as to force the friction driving portion of the second driving element to be abutted against the second friction actuating portion by means of an elastic force of the second elastic element, so that the second driving element is frictionally coupled to the second frame carrier.

In the camera module according to the present disclosure, the first elastic element and the second elastic element are designed as adhesives having elasticity.

In the camera module according to the present disclosure, thickness dimensions of the first elastic element and the second elastic element are between 10 um and 50 um.

In the camera module according to the present disclosure, the first prepressing component comprises a first magnetic attraction element arranged on the first frame carrier and a second magnetic attraction element arranged on the second frame carrier and corresponding to the first magnetic attraction element, so as to force the friction driving portion of the first driving element to be abutted against the first friction actuating portion by means of a magnetic attraction effect between the first magnetic attraction element and the second magnetic attraction element, so that the first driving element is frictionally coupled to the first frame carrier; and the second prepressing component comprises a third magnetic attraction element arranged on the second frame carrier and a fourth magnetic attraction element arranged on the outer frame carrier and corresponding to the third magnetic attraction element, so as to force the friction driving portion of the second driving element to be abutted against the second friction actuating portion by means of a magnetic attraction effect between the third magnetic attraction element and the fourth magnetic attraction element, so that the second driving element is frictionally coupled to the second frame carrier.

In the camera module according to the present disclosure, the first frame carrier comprises a first groove recessedly formed on its surface, and the first friction actuating portion is arranged in the first groove, wherein the first groove forms a guiding groove for guiding the friction driving portion of the first driving element to move.

In the camera module according to the present disclosure, the second frame carrier comprises a second groove recessedly formed on its surface, and the second friction actuating portion is arranged in the second groove, wherein the second groove forms a guiding groove for guiding the friction driving portion of the second driving element to move.

In the camera module according to the present disclosure, the first groove has a reduced opening size, and/or the second groove has a reduced opening size.

In the camera module according to the present disclosure, the driving assembly further comprises a first guiding mechanism arranged between the first frame carrier and the second frame carrier, and a second guiding mechanism arranged between the second frame carrier and the outer frame carrier.

In the camera module according to the present disclosure, the driving assembly further comprises a first guiding mechanism arranged between the first frame carrier and the second frame carrier, and a second guiding mechanism arranged between the second frame carrier and the outer frame carrier.

Further objects and advantages of the present disclosure will be fully embodied through the understanding of the following description and the drawings.

These and other objects, characteristics and advantages of the present disclosure are fully embodied through the following detailed description, drawings and claims.

BRIEF DESCRIPTION OF THE DRAWINGS

The above and other objects, features, and advantages of the present disclosure will become more apparent from the detailed description of the embodiments of the present disclosure in conjunction with the drawings. The drawings, which are used to provide a further understanding of the embodiments of the present disclosure and constitute a part of the description, are used to explain the present disclosure together with the embodiments of the present disclosure, and do not constitute a limitation of the present disclosure. In the drawings, the same reference signs generally represent the same members or steps.

DETAILED DESCRIPTION OF THE EMBODIMENTS

Hereinafter, exemplary embodiments according to the present disclosure will be described in detail with reference to the drawings. Obviously, the described embodiments are only a part of the embodiments of the present disclosure, rather than all the embodiments of the present disclosure. It should be understood that the present disclosure is not limited by the exemplary embodiments described herein.

Exemplary Camera Module

Figure 1:
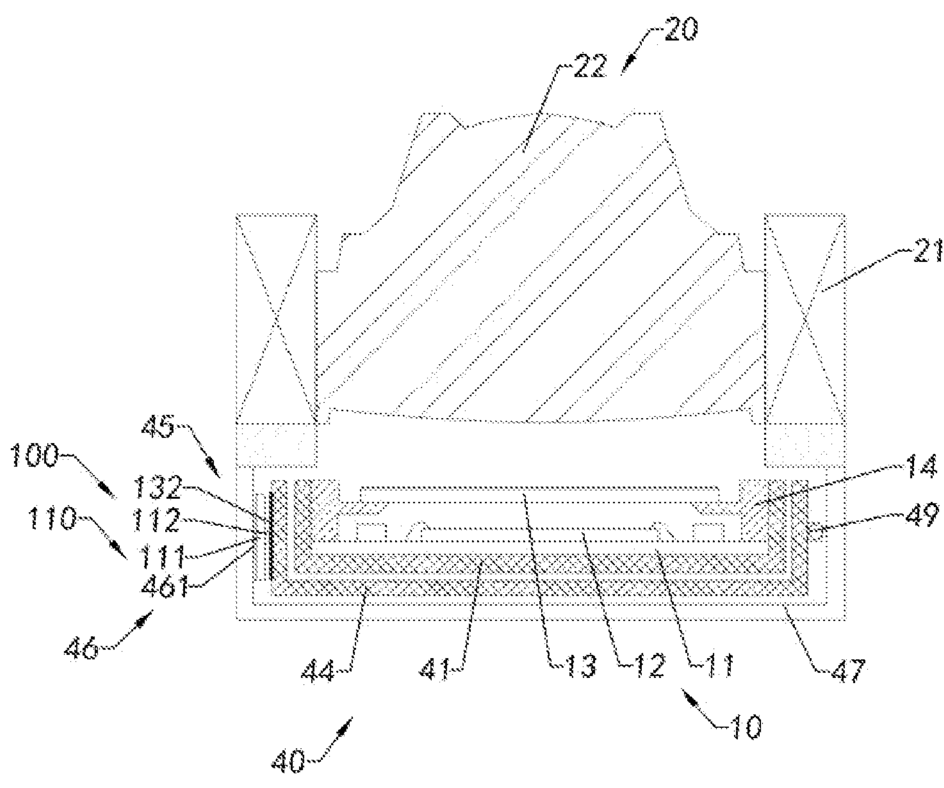
FIG. 1 illustrates a schematic view of a camera module according to an embodiment of the present disclosure.

As shown in FIG. 1, a camera module according to an embodiment of the present disclosure is explained. The camera module includes a photosensitive assembly 10, a lens assembly 20 held on a photosensitive path of the photosensitive assembly 10, and a driving assembly 40 for driving the photosensitive assembly 10 for optical image stabilization.

Correspondingly, the lens assembly 20 includes a lens carrier 21 and an optical lens 22 mounted on the lens carrier 21. In this embodiment, the optical lens 22 includes a lens barrel and at least one optical lens mounted in the lens barrel.

It should be known by those skilled in the art that the resolution of the optical camera lens 20 is directly proportional to the number of optical lenses within a certain range, that is, the higher the resolution, the more the number of optical lenses. In a specific implementation, the optical lens 22 may be designed as an integrated camera lens, or a split camera lens, wherein when the optical lens 22 is designed as an integrated camera lens, the optical lens 22 includes a lens barrel, and all of the optical lenses are mounted in the lens barrel; and when the optical lens 22 is designed as a split optical camera lens, the optical lens 22 is assembled from at least two camera lens units.

Moreover, in this embodiment, the lens carrier 21 is a fixed carrier, that is, when the optical lens 22 is mounted on the lens carrier 21, the relative positional relationship between the lens carrier 21 and the optical lens 22 does not change. It should be understood that, in other examples of the present disclosure, the lens carrier 21 may also be designed as a driving carrier, so that the relative positional relationship between the optical camera lens 21 and the photosensitive assembly 10 is changed by the driving carrier for autofocus, which is not limited in the present disclosure.

Figure 2:
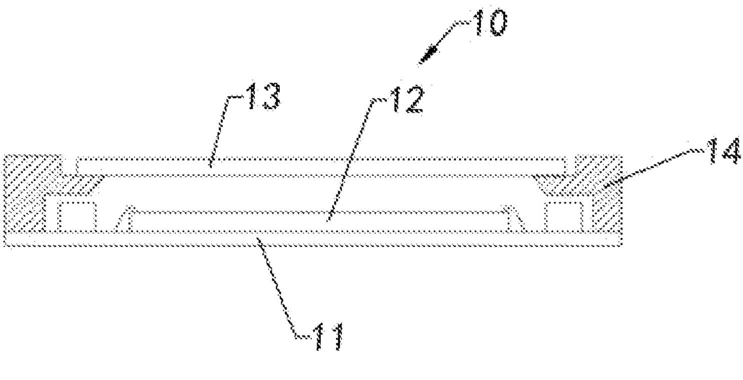
FIG. 2 illustrates a schematic view of a photosensitive assembly of the camera module according to the embodiment of the present disclosure.

As shown in FIG. 2, in this embodiment, the photosensitive assembly 10 includes a circuit board 11, a photosensitive chip 12 electrically connected to the circuit board 11, and a filter element 13 held on the photosensitive path of the photosensitive chip 12, wherein the circuit board 11 forms a mounting substrate of the photosensitive assembly 10. The circuit board may be designed as a Printed Circuit Board (PCB), a software combination board, or a reinforced Flexible Printed Circuit (PFC). Moreover, in some examples, a reinforcing plate (not shown) may also be arranged below the circuit board 11. For example, a steel sheet is arranged below the circuit board, so as to strengthen the strength of the circuit board and improve the heat dissipation performance of the photosensitive assembly through the steel sheet.

Further, in an example illustrated in FIG. 2, the photosensitive assembly 10 further includes a bracket 14 arranged on the circuit board 11, wherein the filter element 13 is mounted on the bracket 14 to be held on the photosensitive path of the photosensitive chip 12. In other examples of the present disclosure, a specific implementation that the filter element 13 is held on the photosensitive path of the photosensitive chip 12 is not limited in the present disclosure. For example, the filter element 13 may be designed as a filter film and coated on the surface of a certain optical lens of the lens group to play the effect of light filtering. For another example, the photosensitive assembly 10 may further include a filter element bracket (not shown) mounted on the bracket 14, wherein the filter element 13 is held on the photosensitive path of the photosensitive chip 12 by being mounted on the filter element bracket.

In a specific example of the embodiment of the present disclosure, the bracket 14 may be designed as a plastic bracket, which is attached to the circuit board 11 by an adhesive. In other examples of the embodiment of the present disclosure, the bracket 14 may also be designed as an integrated bracket integrally formed on the circuit board 11, such as a molded bracket, which is not limited in the present disclosure.

As described previously, in order to meet the increasingly widespread market demands, high pixels, large chips and small sizes are irreversible development trends of the existing camera modules. With the development of photosensitive chips in the direction of high pixels and large chips, the size of optical components (such as filter elements, and optical camera lenses) that are compatible with photosensitive chips is also gradually increasing, which brings new challenges to driving elements used to drive the optical components for optical performance adjustment (e.g., optical focus, optical image stabilization, etc.).

Specifically, existing driving elements for driving optical components are electromagnetic motors, such as Voice Coil Motors (VCM), Shape Memory Alloy Actuators (SMA), etc. However, as the size of optical components increases, resulting in an increase in weight, the existing electromagnetic motors are gradually unable to provide sufficient driving force to drive the optical components to move. Quantitatively, existing voice coil motors and shape memory alloy drivers are only suitable for driving an optical component with a weight less than 100 mg. That is, if the weight of the optical component exceeds 100 mg, the existing drivers will not be able to meet the application requirements of camera modules.

In addition, as mobile terminal devices are becoming smaller and thinner, the density of component layout inside the driving element has also increased. Correspondingly, the existing voice coil motor is internally provided with a coil and magnets. When the distance between two magnets is too close (less than 7 mm), their internal magnetic fields will interact with each other, resulting in displacement or vibration of the magnets, and reducing the stability of its drive control.

Therefore, an adapted new driving solution for camera modules is needed. The new driver can not only meet the driving requirements of the camera module for optical performance adjustment, but also meet the development requirements of lightness and thinness of the camera module.

That is, for a camera module, a new driver needs to meet the following requirements: relatively larger driving force, and better driving performance (specifically including: higher accuracy driving control and longer driving stroke). At the same time, in addition to seeking a driver that meets the requirements of new technologies, when selecting a new driver, it is also necessary to consider that the selected driver can adapt to the current development trend of lightness and thinness of the camera module.

After research and testing, the present disclosure provides a piezoelectric actuator with a new structure, which can meet the technical requirements of the camera module for the driver. Moreover, the piezoelectric actuator is further arranged in the camera module in a suitable arrangement, so that it meets the structural and dimensional design requirements of the camera module.

Figure 4A:
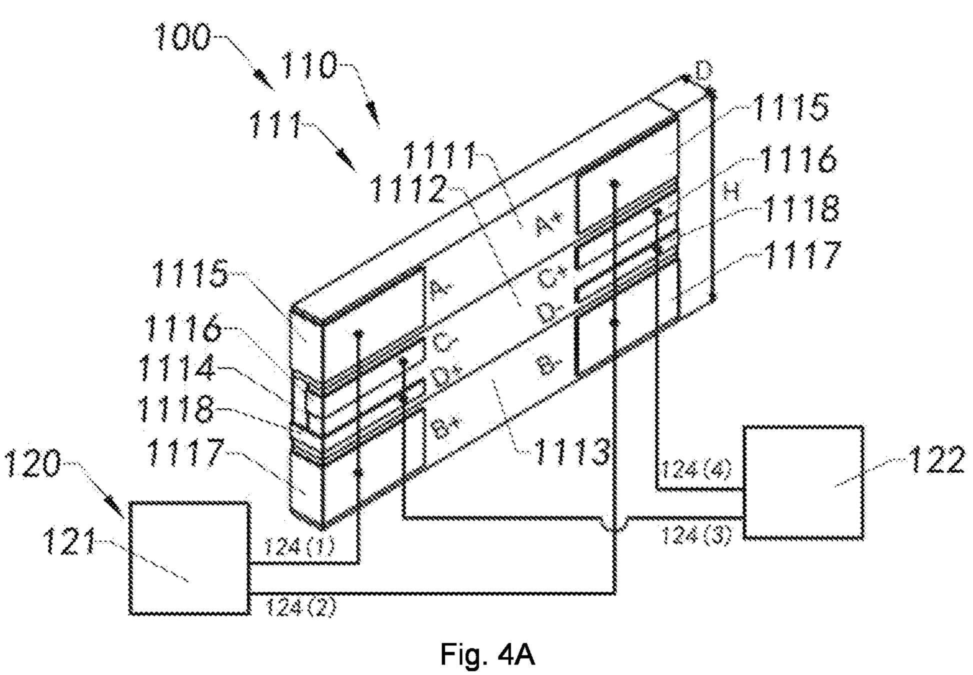
FIG. 4A illustrates a schematic view of a piezoelectric actuator according to an embodiment of the disclosure.

FIGS. 4A to 4L illustrate schematic views of a piezoelectric actuator according to an embodiment of the disclosure. As shown in FIG. 4A, the piezoelectric actuator 100 according to the embodiment of the present disclosure includes an actuating system 110 and a driving circuit system 120, wherein the actuating system 110 moves in a two-dimensional trajectory along a preset direction in a manner of bending vibration along two directions under the control of the driving circuit system 120. In particular, in this embodiment, the piezoelectric actuator 100 is a high-efficiency semi-resonant driving system. After being turned on, the actuating system 110 of the piezoelectric actuator 100 moves in the two-dimensional trajectory along the preset direction in a manner of bending vibration along two directions to frictionally couple and move the acted object along the preset direction.

As shown in FIG. 4A, in this embodiment, the actuating system 110 includes a piezoelectric plate structure 111 and a friction driving portion 112 fixed to the piezoelectric plate structure 111. Here, the piezoelectric plate structure 111 may be symmetrical, or may also be asymmetrical. The piezoelectric plate structure 111 has a first side surface extending along its depth direction and a second side surface extending along its height direction and adjacent to the first side surface, wherein the piezoelectric plate structure 111 has a first resonance frequency along its depth direction (e.g., D as illustrated in FIG. 4A) and a second resonance frequency along its height direction (e.g., H as illustrated in FIG. 4A). Usually, the height dimension of the piezoelectric plate structure 111 is greater than its depth dimension, that is, the second resonance frequency is greater than the first resonance frequency.

Figure 4B:
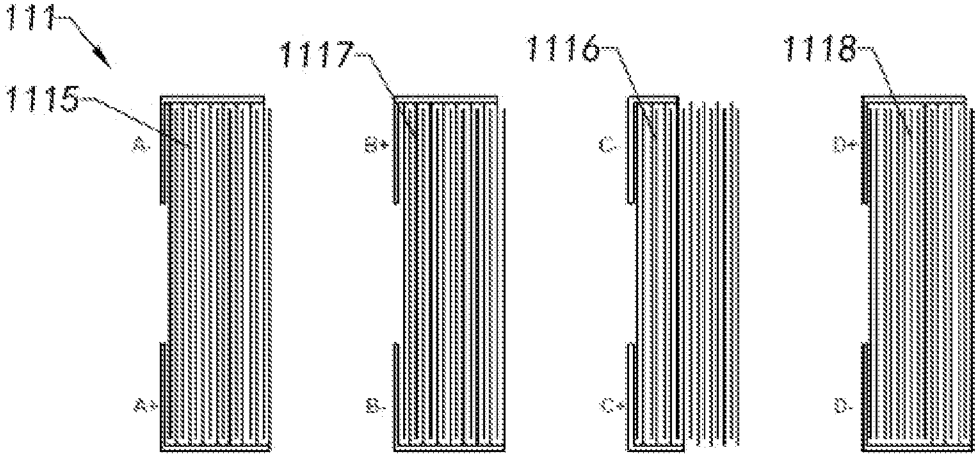
FIG. 4B illustrates a schematic view of a piezoelectric plate structure of the piezoelectric actuator according to the embodiment of the present disclosure.

As shown in FIG. 4B, in this embodiment, the piezoelectric plate structure 111 includes at least one piezoelectric layer formed together. The thickness dimension of the piezoelectric plate structure 111 is in the range of 5 um to 40 um. In particular, in the embodiment of the present disclosure, the at least one piezoelectric layer structure may be a single piezoelectric layer, or may also include a plurality of piezoelectric layers stacked together (for example, a plurality of parallel piezoelectric layers co-fired together). Here, compared with the single piezoelectric layer, the plurality of piezoelectric layers can achieve similar effects by applying a smaller voltage.

As shown in FIG. 4A, in this embodiment, the piezoelectric plate structure 111 includes a first piezoelectric region 1111, a second piezoelectric region 1112 and a third piezoelectric region 1113 formed on the second side surface, and a fourth piezoelectric region 1114 formed on the first side surface, wherein the second piezoelectric region 1112 is located between the first piezoelectric region 1111 and the third piezoelectric region 1113, and the fourth piezoelectric region 1114 is adjacent to the second piezoelectric region 1112. Moreover, the piezoelectric plate structure 111 further includes a first electrode pair 1115 electrically connected to the first piezoelectric region 1111, a second electrode pair 1116 electrically connected to the second piezoelectric region 1112, a third electrode pair 1117 electrically connected to the third piezoelectric region 1113 and a fourth electrode pair 1118 electrically connected to the fourth piezoelectric region 1114. That is, in the example illustrated in FIG. 1, the piezoelectric plate structure 111 includes 4 piezoelectric regions and four electrode pairs that are electrically connected to the 4 piezoelectric regions, respectively. Of course, in other examples of the present disclosure, the piezoelectric plate structure 111 may include other numbers of piezoelectric regions and electrode pairs, which is not limited in the present disclosure.

Moreover, in some other examples of the present disclosure, one piezoelectric region of the first piezoelectric region 1111 and the third piezoelectric region 1113, and/or, one piezoelectric region of the second piezoelectric region 1112 and the fourth piezoelectric regions 1114 may be passive, which can reduce the driving amplitude without changing the operation of the actuating system 110.

Further, in the embodiment of the present disclosure, the first piezoelectric region 1111, the second piezoelectric region 1112, the third piezoelectric region 1113 and the fourth piezoelectric region 1114 have polarities generated by polarization during the manufacturing process, thereby forming positive and negative electrodes. Specifically, the first piezoelectric region 1111 is polarized during the manufacturing process, so that one electrode of the first electrode pair 1115 corresponding to the first piezoelectric region 1111 forms a negative electrode (e.g., A− as illustrated in FIG. 4A), and the other electrode forms a positive electrode (e.g., A+ as illustrated in FIG. 4A); the third piezoelectric region 1113 is polarized during the manufacturing process, so that one electrode of the third electrode pair 1117 corresponding to the third piezoelectric region 1113 forms a negative electrode (e.g., B− as illustrated in FIG. 4A), and the other electrode forms a positive electrode (e.g., B+ as illustrated in FIG. 4A); the second piezoelectric region 1112 is polarized during the manufacturing process, so that one electrode of the second electrode pair 1116 corresponding to the second piezoelectric region 1112 forms a negative electrode (e.g., C− as illustrated in FIG. 4A), and the other electrode forms a positive electrode (e.g., C+ as illustrated in FIG. 4A); and the fourth piezoelectric region 1114 is polarized during the manufacturing process, so that one electrode of the fourth electrode pair 1118 corresponding to the fourth piezoelectric region 1114 forms a negative electrode (e.g., D− as illustrated in FIG. 4A), and the other electrode forms the positive electrode (e.g., D+ as illustrated in FIG. 4A). It should be noted that in this embodiment, each electrode in the first electrode pair 1115 and/or the second electrode pair 1116 and/or the third electrode pair 1117 and/or the second electrode pair 1116 has an "L" shape.

As shown in FIGS. 4A and 4B, in this embodiment, one electrode of the first electrode pair 1115 is coupled to and alternatively connected to one internal electrode of each piezoelectric layer of the first piezoelectric region 1111, and the other electrode of the first electrode pair 1115 is alternatively connected to an internal electrode of the first piezoelectric region 1111 opposite to each piezoelectric layer, wherein during the polarization process, one electrode of the first electrode pair 1115 is determined as a positive electrode and the other is determined as a negative electrode. One electrode of the second electrode pair 1116 is coupled to and alternatively connected to an internal electrode of each piezoelectric layer of the second piezoelectric region 1112, and the other electrode of the second electrode pair 1116 is alternatively connected to an internal electrode of the second piezoelectric region 1112 opposite to each piezoelectric layer, wherein during the polarization process, one electrode of the second electrode pair 1116 is determined as a positive electrode and the other electrode is determined as a negative electrode. One electrode of the third electrode pair 1117 is coupled to and alternatively connected to an internal electrode of each piezoelectric layer of the third piezoelectric region 1113, and the other electrode of the third electrode pair 1117 is alternatively connected to an internal electrode of the third piezoelectric region 1113 opposite to each piezoelectric layer, wherein during the polarization process, one electrode of the third electrode pair 1117 is determined as a positive electrode and the other electrode is determined as a negative electrode. One electrode of the third electrode pair 1117 is coupled to and alternatively connected to an internal electrode of each piezoelectric layer of the third piezoelectric region 1113, and the other electrode of the third electrode pair 1117 is alternatively connected to an internal electrode of the third piezoelectric region 1113 opposite to each piezoelectric layer, wherein during the polarization process, one electrode of the third electrode pair 1117 is determined as a positive electrode and the other electrode is determined as a negative electrode.

Further referring to FIG. 4A, in this embodiment, the driving circuit system 120 includes a first driving circuit 121 and a second driving circuit 122, the first driving circuit 121 is electrically connected to the first electrode pair 1115 and the third electrode pair 1117, and the second driving circuit 122 is electrically connected to the second electrode pair

Figure 3:
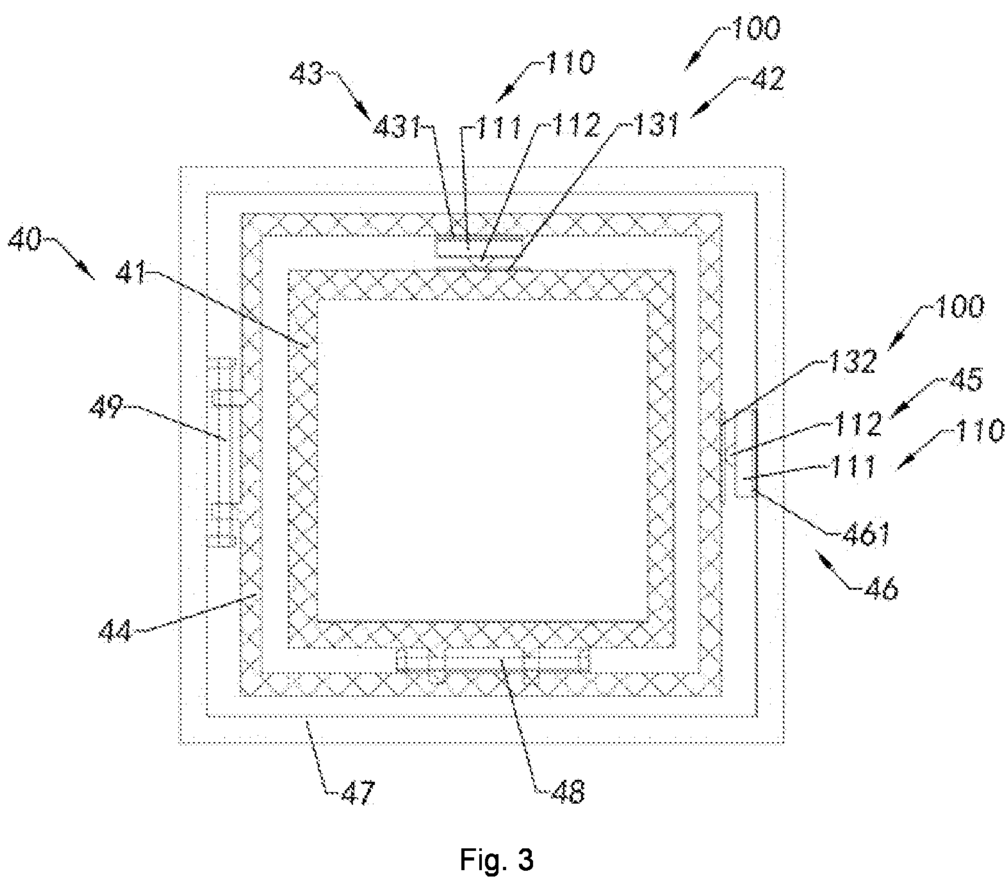
FIG. 3 illustrates another schematic view of the camera module according to the embodiment of the present disclosure.

1116 and the fourth electrode pair 1118, wherein the first driving circuit 121 and the second driving circuit 122 may be a full-bridge driving circuit, or may also be other driving circuits. In particular, in this embodiment, the driving circuit system 120 has four types of output circuit vibration signals: 124(1) to 124(4), wherein the output circuit vibration signal may be an ultrasonic square wave vibration signal as shown in FIG. 3, or may also be other signals, for example, a sinusoidal signal.

When the piezoelectric actuator 100 is working, the piezoelectric plate structure 111 has two bending modes: mode 1 and mode 2, wherein mode 1 and mode 2 each have a different resonance frequency. The vibration amplitude of the bending mode of the piezoelectric plate structure 111 depends on the vibration frequency of the output circuit vibration signal. Specifically, when the driving circuit system 120 applies a circuit vibration signal to the piezoelectric plate structure 111 at the resonance frequency of one of the two bending modes (for example, the resonance frequency of mode 1), the vibration amplitude is completely amplified for the bending mode operating at its resonance frequency and only partially amplified for the other bending mode operating at partial resonance. More clearly, when the vibration frequency of the circuit vibration signal output by the first driving circuit 121 is the first resonance frequency, the piezoelectric plate structure 111 resonates in its height direction and partially resonates in its depth direction, so that the piezoelectric plate structure 111 moves in a two-dimensional trajectory along a preset direction in a manner of bending vibration along two directions; and wherein when a vibration frequency of a circuit vibration signal input by the second driving circuit 122 is the second resonance frequency, the piezoelectric plate structure 111 resonates in its depth direction and partially resonates in its height direction, so that the piezoelectric plate structure 111 moves in a two-dimensional trajectory along a preset direction in a manner of bending vibration along two directions.

Figure 4C:
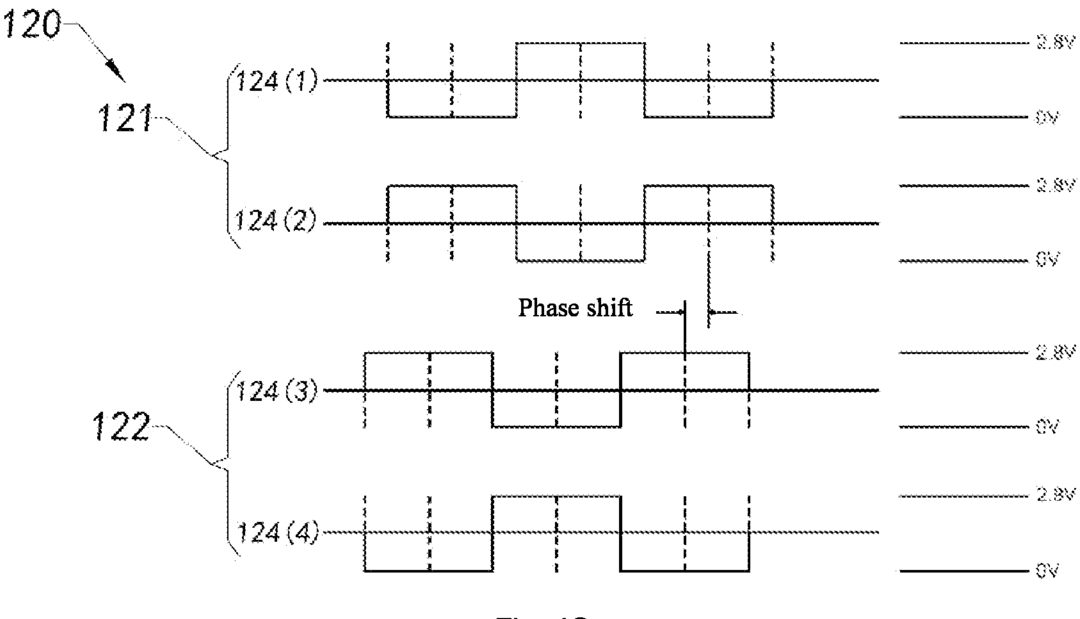
FIG. 4C illustrates a schematic view of a driving circuit system of the piezoelectric actuator according to the embodiment of the present disclosure.

More specifically, in the example illustrated in FIGS. 4A and 4C, the first driving circuit 121 and the second driving circuit 122 can output four types of circuit vibration signals: 124(1) to 124(4). In this embodiment, the voltage of the circuit vibration signal is 2.8 V, and the four vibration signals each have a vibration frequency, which is substantially equal to the resonance frequency of any one of the two bending modes of the piezoelectric plate structure 111. That is, the vibration frequency is substantially equal to the first resonance frequency or the second resonance frequency. In addition, the circuit vibration signals from outputs 124(1) to 124(2) are phase-shifted by the driving circuit system 120 by about 0 to 90 degrees relative to the circuit vibration signals from outputs 124(3) to 124(4), thereby moving the acted object along one of two directions. When the driving circuit system 120 adjusts the phase shift of outputs 124(1) to 124(2) relative to the outputs 124(3) to 124(4) to about −180 to −90 degrees, so as to move a movable member along an opposite direction (i.e., another opposite direction of the two directions).

Figure 4D:
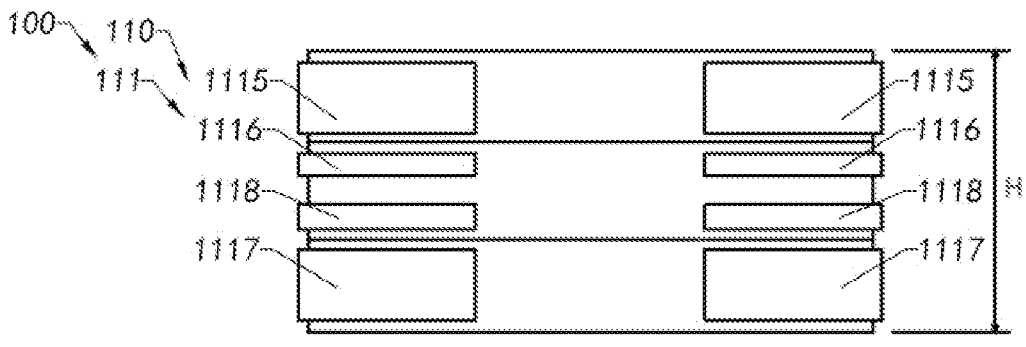
FIGS. 4D to 4F illustrate schematic views of the piezoelectric actuator according to the embodiment of the present disclosure moving in a first mode.
Figure 4E:
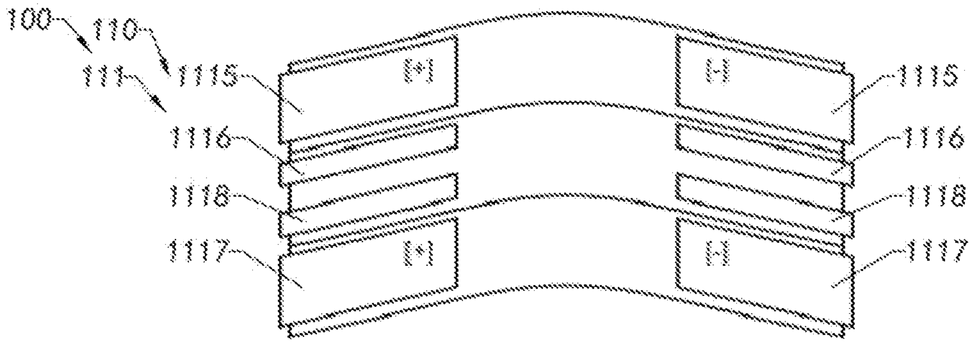
Figure 4F:
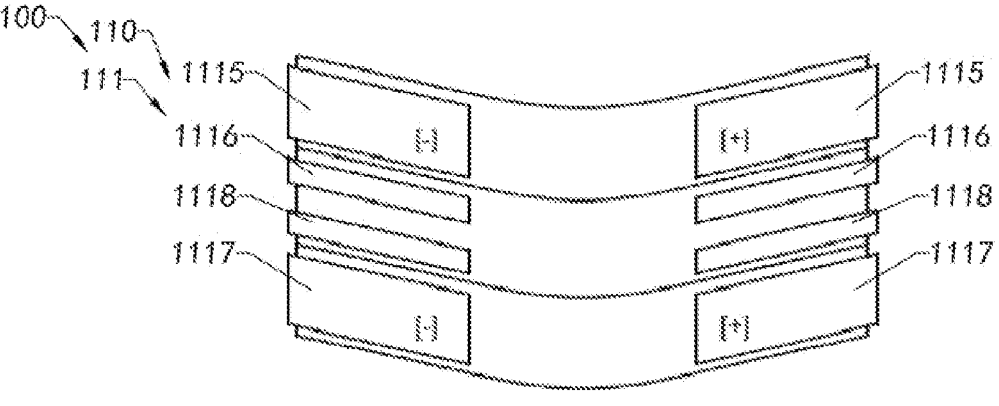

FIGS. 4D to 4F illustrate schematic views of the piezoelectric actuator 100 according to the embodiment of the present disclosure moving in a first mode. As shown in FIGS. 4D to 4F, the bending mode is generated due to the application of circuit vibration signals from outputs 124(1)-124(2) of different stages to the first piezoelectric region 1111 and the third piezoelectric region 1113 having opposite polarities. When the piezoelectricity of all electrodes is 0, FIG. 4D shows a situation when the piezoelectric plate structure 111 is stationary. When the voltage difference between outputs 124(1) and 124(2) is positive, the length of the first piezoelectric region 1111 increases and the length of the third piezoelectric region 1113 decreases so that the piezoelectric plate is bent as shown in FIG. 4E. When the voltage difference between outputs 124(1) and 124(2) is negative, the length of the first piezoelectric region 1111 decreases and the length of the third piezoelectric region 1113 increases so that the piezoelectric plate structure is bent as shown in FIG. 4F.

Figure 4G:
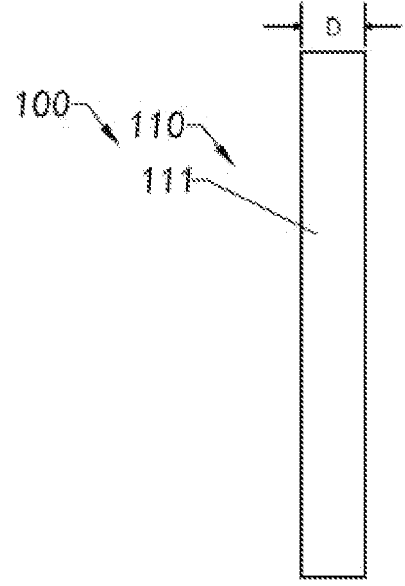
FIGS. 4G to 4I illustrate schematic views of the piezoelectric actuator according to the embodiment of the present disclosure moving in a second mode.
Figure 4H:
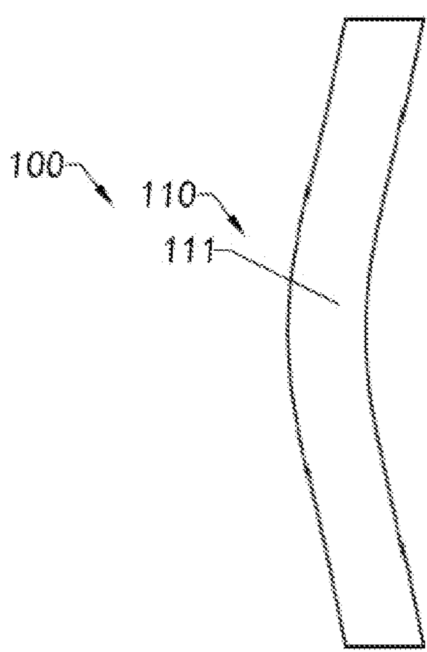
Figures 4I, 4J:
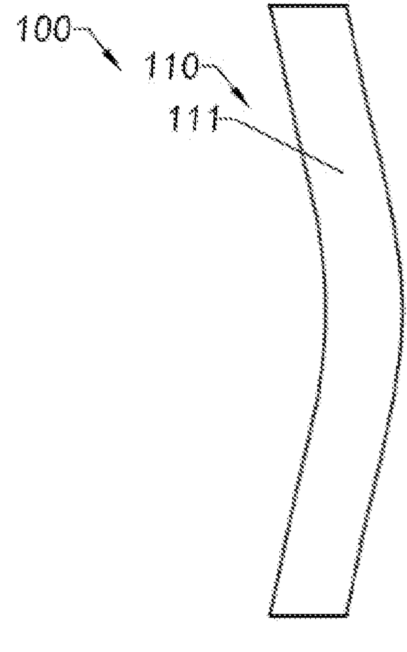
FIG. 4J illustrates another schematic view of the piezoelectric plate structure of the piezoelectric actuator according to the embodiment of the present disclosure.

FIGS. 4G to 4I illustrate schematic views of the piezoelectric actuator 100 according to the embodiment of the present disclosure moving in a second mode.

As shown in FIGS. 4G to 4I, the bending mode is generated due to the application of vibration signals from outputs 124(3)-124(4) of different stages to the second piezoelectric region 1112 and the fourth piezoelectric region 1114 having opposite polarities. When the piezoelectricity of all electrodes is 0, FIG. 4G shows a situation when the piezoelectric plate structure 111 is stationary. When the voltage difference between outputs 124(3) and 124(4) is positive, the length of the second piezoelectric region 1112 decreases and the length of the fourth piezoelectric region 1114 increases so that the piezoelectric plate structure 111 is bent as shown in FIG. 4H. When the voltage difference between outputs 124(3) and 124(4) is negative, the length of the second piezoelectric region 1112 increases and the length of the fourth piezoelectric region 1114 decreases so that the piezoelectric plate structure is bent as shown in FIG. 4I.

Correspondingly, when the output circuit vibration signal as shown in FIG. 3 is applied to the actuating system 110, the actuating system 110 forms a two-dimensional trajectory with an elliptical orbital shape, that is, the driving circuit system 120 can control, according to a phase difference, the direction of rotation of the actuating system 110 on the elliptical orbital path, so that the actuating system 110 cam drive the acted object at a relatively smaller and more precise step speed.

Figures 4K, 4L:
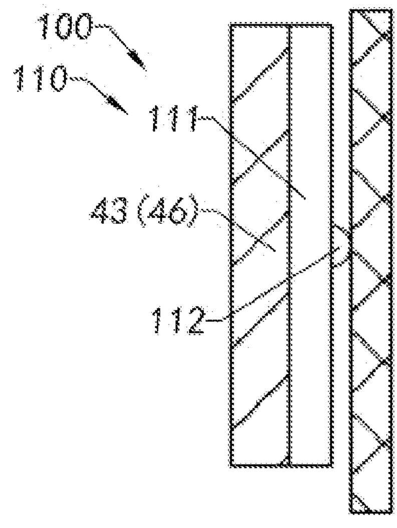
FIG. 4K illustrates a schematic view of the piezoelectric actuator according to the embodiment of the present disclosure acting on a moved object.
FIG. 4L illustrates a schematic view of movement of the piezoelectric actuator according to the embodiment of the present disclosure.

FIG. 4J illustrates another schematic view of the piezoelectric plate structure 111 of the piezoelectric actuator 100 according to the embodiment of the present disclosure. As shown in FIG. 4J, in the embodiment of the present disclosure, the actuating system 110 further includes a friction driving portion 112 fixed to the piezoelectric plate structure 111, wherein the friction driving portion 112 is suitable for being frictionally coupled to the acted object to move the acted object along a predetermined direction by friction. In order to enable the friction driving portion 112 to be frictionally coupled to the acted object, as shown in FIG. 4K, during the installation process, a prepressing component 43/46 is configured for the piezoelectric actuator 100, and the prepressing component 43/46 provides a prepressing force between the piezoelectric actuator 100 and the acted object, so that the friction driving portion 112 of the piezoelectric actuator 100 can be frictionally coupled to the acted object, so as to bring the acted object to move along a predetermined direction by friction, as shown in FIG. 4L.

In particular, in this embodiment, the friction driving portion 112 includes at least one contact pad, which may be fixed to the piezoelectric plate structure 111 along the depth direction, or may also be fixed to the piezoelectric plate structure 111 along the height direction. In this embodiment, the at least one contact pad may have a hemispherical shape. Of course, it may also be in other shapes, for example, a semi-cylindrical shape, a platform, a rectangle, or the like. Preferably, the at least one contact pad is made of a material with better friction performance and durability. For example, it may be made of a metal oxide material (for example, zirconia, alumina or the like).

It is worth mentioning that, compared with a traditional electromagnetic driver, the piezoelectric actuator 100 has the advantages of small size, large driving force and high accuracy. Quantitatively, the piezoelectric actuator 100 according to the embodiment of the present disclosure can provide a driving force ranging from 0.6 N to 2 N, which is sufficient to drive a component with a weight more than 100 mg.

In addition to being able to provide a relatively large driving force, the piezoelectric actuator 100 also has other advantages over the traditional electromagnetic motor scheme and memory alloy motor scheme, including but not limited to: a relatively small size (with a slender shape), better response accuracy, a relatively simpler structure, relatively simpler driving control, high product consistency, no electromagnetic interference, a relatively larger stroke, short stabilization time, a relatively smaller weight, etc.

Specifically, the camera module requires that the configured driver has characteristics such as a long driving stroke and good alignment accuracy. In the existing voice coil motor scheme, in order to ensure the linearity of motion, it is necessary to design additional guide rods or ball guide rails; it is also necessary to adapt large-sized driving magnets/coils at the side part of the camera lens; and it is also necessary to set up auxiliary positioning devices such as balls, spring leaf, and suspension wires. In order to accommodate more components, ensure the structural strength and reserve structural gaps, it often leads to the larger lateral dimension of the module, the complicated structural design, and the heavier weight of the module. The memory alloy motor scheme is limited by the relatively small stroke that the memory alloy scheme can provide in the same proportion, and there are also reliability risks such as potential disconnection.

The piezoelectric actuator 100 has a relatively simple structure, and the assembly structure is simpler. In addition, the size of its elements is substantially unrelated to the size of the motion stroke of the piezoelectric actuator 100. Therefore, the piezoelectric actuator 100 can realize the advantages of large driving force, small size, and small weight. Also, it is designed to match a larger stroke or a heavier component weight, and the integration degree in the design is also higher.

Further, the piezoelectric actuator 100 pushes the object to be pushed to perform micron-scale motion in a frictional contact manner. Compared with the non-contact manner of driving the object to be pushed in the electromagnetic scheme, in which it needs to rely on electromagnetic force to counteract gravity and frictional force, it has the advantages of greater driving force, greater displacement and lower power consumption, and also has higher control accuracy. Moreover, when there are a plurality of motor mechanisms, the piezoelectric actuator 100 does not have a magnet coil structure, so there is no magnetic interference problem. In addition, the piezoelectric actuator 100 can be self-locked by relying on the frictional force between the components, and thus, the vibration and noise of the camera module during optical image stabilization can be reduced.

After the piezoelectric actuator 100 is selected as a driver to drive the photosensitive assembly 10 for optical image stabilization, specifically, as shown in FIGS. 1 and 3, in this embodiment, the driving assembly 40 includes a first carrying frame 41, a first driving element 42, a first prepressing component 43, a second carrying frame 44, a second driving element 45, a second prepressing component 46, and an outer frame 47, wherein the first driving element 42 and the second driving element 45 are designed as the piezoelectric actuator 100 as described above.

Correspondingly, as shown in FIGS. 1 and 3, in this embodiment, the photosensitive assembly 10 is mounted on the first carrying frame 41, the first driving element 42 is frictionally coupled to the first carrying frame 41 through the first prepressing component 43, and is configured to, after being driven, move along a first direction in a manner of bending vibration along two directions in a two-dimensional trajectory in a plane perpendicular to the optical axis, and thereby drive the first carrying frame 41 by friction, so as to bring the photosensitive assembly 10 to move in the first direction in the plane perpendicular to the optical axis for optical image stabilization. The second carrying frame 44 is externally arranged on the first carrying frame 41, wherein the second driving element 45 is frictionally coupled to the second carrying frame 44 through the second prepressing component 46, and is configured to, after being driven, move along a second direction in a manner of bending vibration along two directions in a two-dimensional trajectory in a plane perpendicular to the optical axis, and thereby drive the second carrying frame 44 by friction, so as to bring the first carrying frame 41 to bring the photosensitive assembly 10 to move in the plane perpendicular to the optical axis for optical image stabilization in a second direction, the first direction being perpendicular to the second direction. In one example, the first direction is an X-axis direction, and the second direction is a Y-axis direction.

Here, the first driving element 42 being frictionally coupled to the first carrying frame 41 includes: the first driving element 42 directly frictionally interacting with the first carrying frame 41, and the first driving element 42 indirectly frictionally interacting with the first carrying frame 41 (that is, although there is no direct friction force between the first driving element 42 and the first carrying frame 41, the friction driving force generated by the first driving element 42 can act on the first carrying frame 41). Correspondingly, the second driving element 43 being frictionally coupled between the second carrying frame 44 and the outer frame 47 includes: the second driving element 43 directly frictionally interacting with the second carrying frame 44, and the second driving element 43 indirectly frictionally interacting with the second carrying frame 44 (that is, although there is no direct friction force between the second driving element 43 and the second carrying frame 44, the frictional driving force generated by the second driving element 44 can act on the second carrying frame 44).

More specifically, in this embodiment, as shown in FIG. 3, the first driving element 42 is sandwiched between the first carrying frame 41 and the second carrying frame 44 through the first prepressing component 43, so that the first driving element 42 is frictionally coupled to the first carrying frame 41.

Correspondingly, in this embodiment, the first prepressing component 43 includes a first elastic element 431, and the first elastic element 431 is arranged between the piezoelectric plate structure 111 of the first driving element 42 and the second carrying frame 44, so as to force the first driving element 42 to be frictionally coupled to the first carrying frame 41 through an elastic force of the first elastic element 431. In an example of the present disclosure, the friction driving portion 112 of the first driving element 42 is directly in contact with the surface of the outer side wall of the first carrying frame 41, and correspondingly, the elastic force provided by the first elastic element 431 can force the friction driving portion 112 of the first driving element 42 to be in contact with the surface of the outer side wall of the first carrying frame 41 to form a frictional contact relationship between the two. In this way, after the first driving element 42 is turned on, the friction driving portion 112 of the first driving element 42 can drive the first carrying frame 41 to move along the first direction by means of friction driving, so as to bring the photosensitive assembly 10 to move along the first direction for optical image stabilization in the first direction.

In a specific example of the present disclosure, the first elastic element 431 is designed as an adhesive having elasticity, that is, the first elastic element 431 is designed as glue having elasticity after being cured. Correspondingly, during the installation process, a layer of adhesive with a thickness of 10 um to 50 um may be applied between the surface of the inner side wall of the second carrying frame 44 and the piezoelectric plate structure 111 of the first driving element 42, so as to form the first elastic element 431 arranged between the piezoelectric plate structure 111 of the first driving element 42 and the second carrying frame 44 after the adhesive is cured and molded. It should be understood that, in this example, the first elastic element 431 can also enable the first driving element 42 to be fixed on the surface of the inner side wall of the second carrying frame 44 while providing the prepressing force. Preferably, the first elastic element 431 has relatively high flatness, that is, when applying the adhesive, it is ensured as much as possible that the applied adhesive has relatively high flatness and uniformity, so that the first driving element 42 can be flatly fixed on the surface of the inner side wall of the second carrying frame 44, thereby improving the driving stability of the first driving element 42.

Corresponding, in this embodiment, as shown in FIG. 3, the second driving element 45 is sandwiched between the second carrying frame 44 and the outer frame 47 through the second prepressing component 46, so that the second driving element 45 is frictionally coupled to the second carrying frame 44. Moreover, it should be noted that, as shown in FIG. 1, the lens carrier 21 of the lens assembly 20 is carried on the outer frame 47.

Further, as shown in FIG. 3, in this embodiment, the second prepressing component 46 includes a second elastic element 461, and the second elastic element 461 is arranged between the piezoelectric plate structure 111 of the second driving element 45 and the outer frame 47, so as to force the second driving element 45 to be frictionally coupled to the second carrying frame 44 through an elastic force of the second elastic element 461. Correspondingly, in a specific example of the present disclosure, the friction driving portion 112 of the second driving element 45 is directly in contact with the surface of the outer side wall of the second carrying frame 44, and correspondingly, the elastic force provided by the second elastic element 461 can force the friction driving portion 112 of the second driving element 45 to be in contact with the surface of the outer side wall of the second carrying frame 44 to form a frictional contact relationship between the two. In this way, after the second driving element 45 is turned on, the friction driving portion 112 of the second driving element 45 can drive the second carrying frame 44 to move along the second direction by means of friction driving, so as to bring the photosensitive assembly 10 to move along the second direction for optical image stabilization in the second direction.

In a specific example of the present disclosure, the second elastic element 461 is designed as an adhesive having elasticity, that is, the second elastic element 461 is designed as glue having elasticity after being cured. Correspondingly, during the installation process, a layer of adhesive with a thickness of 10 um to 50 um may be applied between the surface of the inner side wall of the outer frame 47 and the piezoelectric plate structure 111 of the second driving element 45, so as to form the second elastic element 461 arranged between the piezoelectric plate structure 111 of the second driving element 45 and the outer frame 47 after the adhesive is cured and molded. It should be understood that, in this example, the second elastic element 461 can also enable the second driving element 45 to be fixed on the surface of the inner side wall of the outer frame 47 while providing the prepressing force. Preferably, the second elastic element 461 has relatively high flatness, that is, when applying the adhesive, it is ensured as much as possible that the applied adhesive has relatively high flatness and uniformity, so that the second driving element 45 can be flatly fixed on the surface of the inner side wall of the outer frame 47, thereby improving the driving stability of the second driving element 45.

It is worth mentioning that, in other embodiments of the present disclosure, the first elastic element 431 and the second elastic element 461 may also be designed as elastic elements without viscosity, for example, rubber with the inherent characteristic of elasticity in the material itself, or a spring or leaf spring that produces elasticity due to deformation, etc., which is also not limited in the present disclosure.

Figure 5:
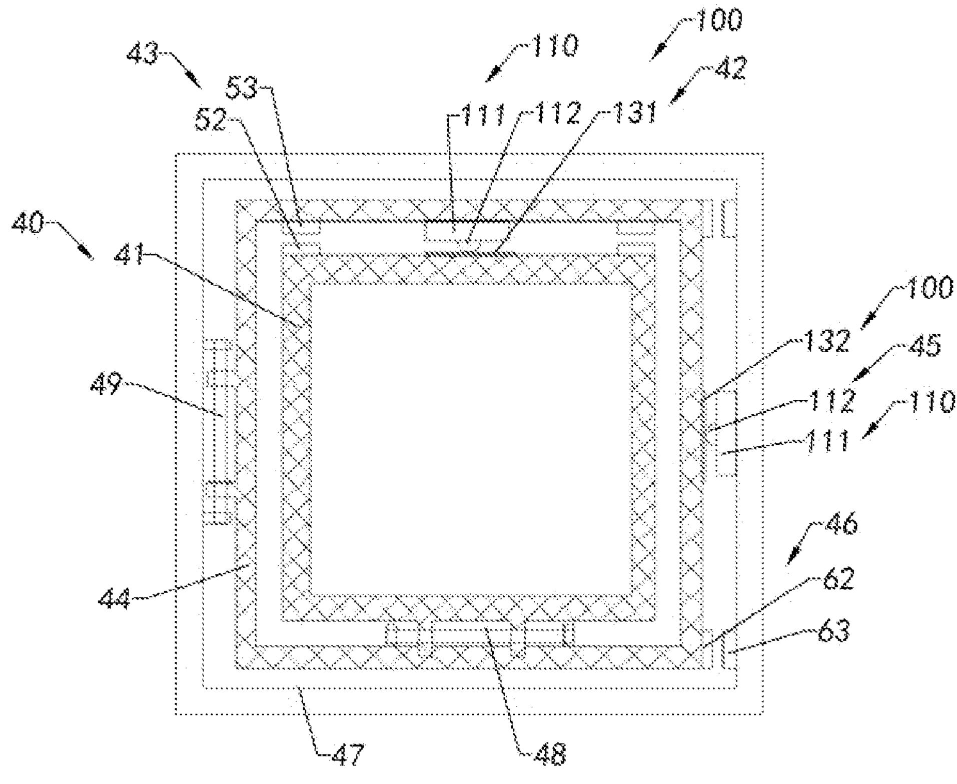
FIG. 5 illustrates a schematic view of a variant of the camera module according to the embodiment of the present disclosure.

It is worth mentioning that, in other variant embodiments of the present disclosure, the structural configuration of the first prepressing component 43 and the second prepressing component 46 may also be adjusted. For example, in a variant as illustrated in FIG. 5, the first prepressing component 43 includes a first magnetic attraction element 52 arranged on the first carrying frame 41 and a second magnetic attraction element 53 arranged on the second carrying frame 44 and corresponding to the first magnetic attraction element 52, as so to force the first driving element 42 to be frictionally coupled to the first carrying frame 41 through an magnetic attraction action between the first magnetic attraction element 52 and the second magnetic attraction element 53. The second prepressing component 46 includes a third magnetic attraction element 62 arranged on the second carrying frame 44 and a fourth magnetic attraction element 63 arranged on the lens carrier 21 and corresponding to the third magnetic attraction element 62, as so to force the second driving element 45 to be frictionally coupled to the second carrying frame 44 through an magnetic attraction action between the third magnetic attraction element 62 and the fourth magnetic attraction element 63.

In this variant, the first magnetic attraction element 52 and the second magnetic attraction element 53 refer to magnetic attraction assemblies that can attract each other. For example, the first magnetic attraction element 52 may be designed as a magnet, and the second magnetic attraction element 53 may be designed as a magnetic component, for example, a material made of a metal such as iron, nickel, cobalt or the like. For another example, the first magnetic attraction element 52 may be designed as a magnet, and the second magnetic attraction element 53 may also be designed as a magnet. In this variant, the third magnetic attraction element 62 and the fourth magnetic attraction element 63 refer to magnetic attraction assemblies that can attract each other. For example, the third magnetic attraction element 62 may be designed as a magnet, and the fourth magnetic attraction element 63 may be designed as a magnetic component, for example, a material made of a metal such as iron, nickel, cobalt or the like. For another example, the third magnetic attraction element 62 may be designed as a magnet, and the fourth magnetic attraction element 63 may also be designed as a magnet.

In order to enable the first driving element 42 and the second driving element 45 to drive the first carrying frame 41 and the second carrying frame 44 more smoothly, as shown in FIG. 3, the driving assembly 40 further includes a first guiding mechanism 48 arranged between the first carrying frame 41 and the second carrying frame 44 and a second guiding mechanism 49 arranged between the second carrying frame 44 and the outer carrying frame 47, wherein the first guiding mechanism 48 is configured to guide the first carrying frame 41 to move along the first direction, and the second guiding mechanism 49 is configured to guide the second carrying frame 44 to move along the second direction.

More specifically, as shown in FIG. 3, in this embodiment, the first guiding mechanism 48 and the second guiding mechanism 49 are designed as guide rod structures. Correspondingly, the first guiding mechanism 48 includes a first guide rod arranged on the outer side wall of the first carrying frame 41 and extending along the first direction, wherein both ends of the first guide rod are fixed on the inner side wall of the second carrying frame 44. In particular, in this embodiment, the first guide rod and the first driving element 42 are oppositely arranged in the same direction. Thus, after the first driving element 42 is turned on, the first carrying frame 41 is guided to move along the direction in which the first guide rod extends, so as to improve the movement stability of the first carrying frame 41.

Correspondingly, in this embodiment, the second guiding mechanism 49 includes a second guide rod arranged on the outer side wall of the second carrying frame 44 and extending along the second direction, wherein both ends of the second guide rod are fixed on the inner side wall of the outer frame 47. In particular, in this embodiment, the second guide rod and the second driving element 45 are oppositely arranged in the same direction. Thus, after the second driving element 45 is turned on, the second carrying frame 44 is guided to move along the direction in which the second guide rod extends, so as to improve the movement stability of the second carrying frame 44.

It is worth mentioning that, in other embodiments of the present disclosure, the first guiding mechanism 48 and the second guiding mechanism 49 may also be realized based on other principles, for example, through a rolling ball-rolling groove mechanism, a slider-sliding groove mechanism, etc., which is not limited in the present disclosure.

In order to optimize the driving performance of the first driving element 42 and the second driving element 45, in the embodiment of the present disclosure, as shown in FIGS. 1 to 3, the driving assembly 40 further includes a first friction actuating portion 131 and a second friction actuating portion 132, wherein the first friction actuating portion 131 is arranged between the first driving element 42 and the first carrying frame 41, the friction driving portion 112 of the first driving element 42 is in contact with the first friction actuating portion 131 under the action of the first prepressing component 43, and the first friction actuating portion 131 is in contact with the surface of the outer side wall of the first carrying frame 41. In this way, the friction driving force provided by the first driving element 42 can act on the first carrying frame 41 through the first friction actuating portion 131, so as to bring the first carrying frame 41 and the photosensitive assembly 10 to move along the first direction. That is, in this variant embodiment, the prepressing force between the friction driving portion 112 of the first driving element 42 and the first carrying frame 41 is an indirect prepressing force, that is, although the friction driving portion 112 of the first driving element 42 is not in direct contact with the first carrying frame 41, there is still a prepressing force between the two, so that the friction driving portion 112 of the first driving element 42 can drive the first carrying frame 41 by means of friction driving.

Correspondingly, the second friction actuating portion 132 is arranged between the second driving element 45 and the second carrying frame 44, and the friction driving portion 112 of the second driving element 45 is in contact with the second friction actuating portion 132 under the action of the second prepressing component 46, and the second friction actuating portion 132 is in contact with the surface of the outer wall of the second carrying frame 44. In this way, the friction driving force provided by the second driving element 45 can act on the second carrying frame 44 via the second friction actuating portion 132, so as to bring the second carrying frame 44, the first carrying frame 41 and the photosensitive assembly 10 to move along the second direction for optical image stabilization in the second direction.

More specifically, as shown in FIG. 1, in this embodiment, the first friction actuating portion 131 has a first surface and a second surface opposite to the first surface, wherein under the action of the first prepressing component 43, the first surface of the first friction actuating portion 131 is in contact with the surface of the outer side wall of the first carrying frame 41, and the second surface is in contact with the end face of at least one of the plurality of friction driving element 121 at the second end. In this way, the friction driving portion 112 of the first driving element 42 is in contact with the first friction actuating portion 131 and the first friction actuating portion 131 is in contact with the first carrying frame 41, so that the friction driving force provided by the first driving element 42 can act on the first carrying frame 41 via the first friction actuating portion 131. Correspondingly, the second friction actuating portion 132 has a third surface and a fourth surface opposite to the third surface, wherein under the action of the second prepressing component 46, the third surface of the second friction actuating portion 132 is in contact with the surface of the outer side wall of the second carrying frame 44, and the fourth surface is in contact with the end surface of at least one of the plurality of friction driving elements 121 at the second end. In this way, the friction driving portion 112 of the second driving element 45 is in contact with the second friction actuating portion 132 and the second friction actuating portion 132 is in contact with the second carrying frame 44, so that the friction driving force provided by the second driving element 45 can act on the second carrying frame 44 via the second friction actuating portion 132.

It is worth mentioning that, although in the example illustrated in FIG. 1, the first friction actuating portion 131 and the second friction actuating portion 132, as a separate component, are arranged between the first driving element 42 and the first carrying frame 41, and between the second driving element 45 and the second carrying frame 44, respectively, for example, the first friction actuating portion 131 is implemented is a separate component and is attached to the side surface of the first carrying frame 41, or, the second friction actuating portion 132 is designed as a separate component and is attached to the side surface of the second carrying frame 44. For another example, the first friction actuating portion 131 is designed as a coating coated on the side surface of the first carrying frame 41, or the second friction actuating portion 132 is designed as a coating coated on the side surface of the second carrying frame 44. It should be understood that, in other examples of the present disclosure, the first friction actuating portion 131 may also be integrally formed on the surface of the outer side wall of the first carrying frame 41, that is, the first friction actuating portion 131 and the first carrying frame 41 has an integrated structure. Of course, in other examples of the present disclosure, the second friction actuating portion 132 may also be integrally formed on the surface of the outer side wall of the second carrying frame 44, that is, the second friction actuating portion 132 and the second carrying frame 44 has an integrated structure.

Figure 6:
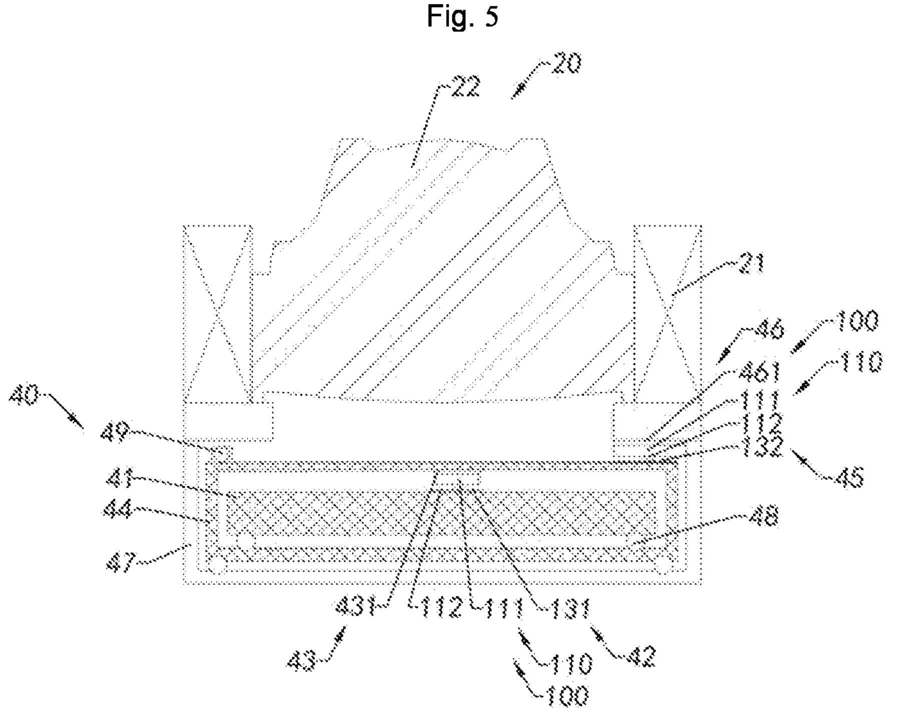
FIG. 6 illustrates a schematic view of another variant of the camera module according to the embodiment of the present disclosure.

FIG. 6 illustrates a schematic view of still another variant of the camera module according to the embodiment of the present disclosure. Compared with the example illustrated in FIG. 1, in this variant embodiment, the arrangement of the first driving element 42 and the second driving element 45 is adjusted.

Specifically, in the example illustrated in FIGS. 1 and 3, the first driving element 42 is located on the side part of the first carrying frame 41, and the second driving element 45 is located on the side part of the second carrying frame 44. In contrast, as shown in FIG. 6, in this variant embodiment, the first driving element 42 is located on the upper part of the first carrying frame 41, and the second driving element 45 is located on the upper part of the second carrying frame 44.

In a specific example of this variant, the first driving element 42 is sandwiched between the first carrying frame 41 and the second carrying frame 44 up and down through the first prepressing component 43. In this way, the first driving element 42 is frictionally coupled to the first carrying frame 41. The second driving element 45 is sandwiched between the second carrying frame 44 and the lens carrier 21 up and down through the second prepressing component 46. In this way, the second driving element 45 is frictionally coupled to the second carrying frame 44.

Figure 7:
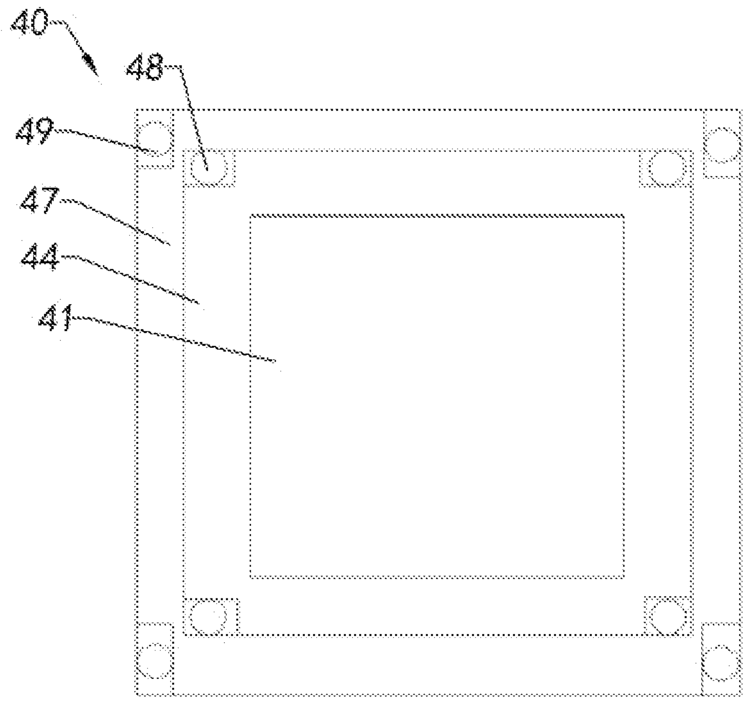
FIG. 7 illustrates a schematic view of another variant of the camera module according to the embodiment of the present disclosure.

Correspondingly, the driving assembly 40 further includes a first guiding mechanism 48 arranged between the first carrying frame 41 and the second carrying frame 44, and a second guiding mechanism 49 arranged between the second carrying frame 44 and the outer frame 47. However, unlike the example illustrated in FIGS. 1 and 3, in this variant embodiment, the first guiding mechanism 48 and the second guiding mechanism 49 are designed as a rolling ball-rolling groove mechanism, as shown in FIG. 7.

Figure 8:
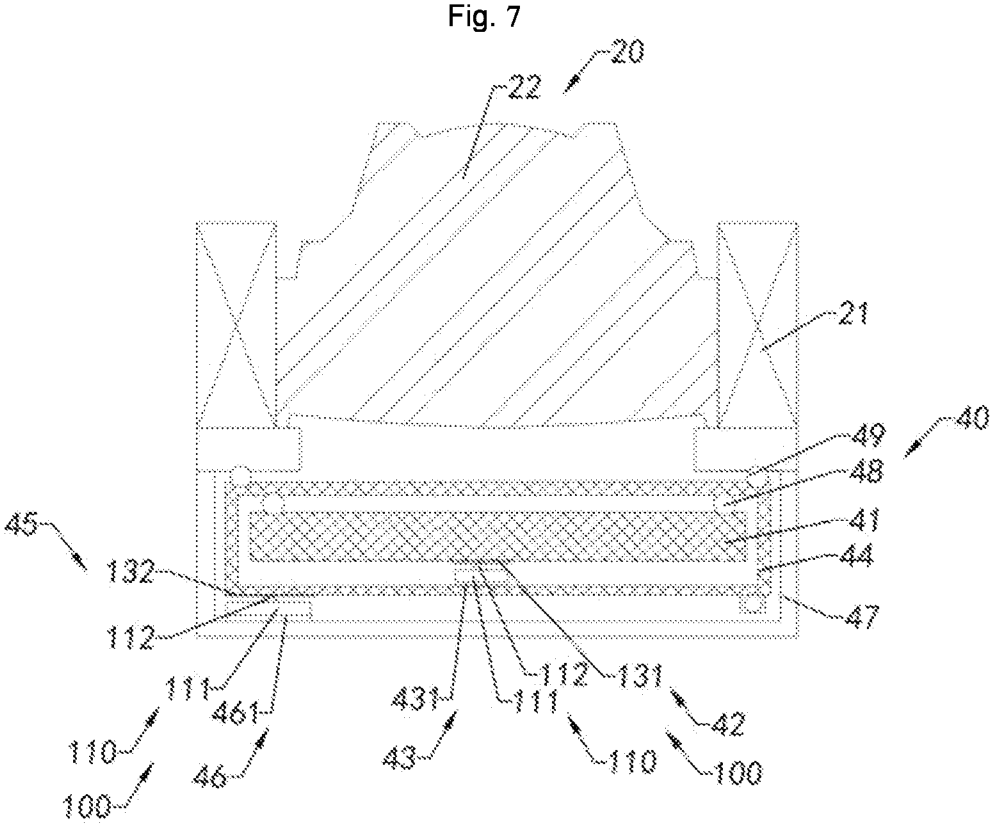
FIG. 8 illustrates a schematic view of still another variant of the camera module according to the embodiment of the present disclosure.

FIG. 8 illustrates a schematic view of still another variant of the camera module according to the embodiment of the present disclosure. Compared with the example illustrated in FIG. 1, in this variant embodiment, the arrangement of the first driving element 42 and the second driving element 45 is adjusted again.

Specifically, as shown in FIG. 8, in this variant embodiment, the first driving element 42 is located on the lower part of the first carrying frame 41, and the second driving element 45 is located on the lower part of the second carrying frame 44.

In a specific example of this variant, the first driving element 42 is sandwiched between the first carrying frame 41 and the second carrying frame 44 up and down through the first prepressing component 43. In this way, the first driving element 42 is frictionally coupled to the first carrying frame 41. The second driving element 45 is sandwiched between the second carrying frame 44 and the outer frame 47 up and down through the second prepressing component 46. In this way, the second driving element 45 is frictionally coupled to the second carrying frame 44.

Correspondingly, the driving assembly 40 further includes a first guiding mechanism 48 arranged between the first carrying frame 41 and the second carrying frame 44, and a second guiding mechanism 49 arranged between the second carrying frame 44 and the outer frame 47. However, unlike the example illustrated in FIGS. 1 and 3, in this variant embodiment, the first guiding mechanism 48 and the second guiding mechanism 49 are designed as a rolling ball-rolling groove mechanism, as shown in FIG. 8.

In summary, the camera module based on the embodiment of the present disclosure is explained, wherein the camera module adopts the piezoelectric actuator 100 as a driver, which can not only meet the driving requirements of the camera module for optical performance adjustment, but also meet the development demands of the camera module for lightness and thinness.

Although the camera module is a traditional upright camera module as an example in the embodiment of the present disclosure, it should be understood by those of ordinary skill in the art that the piezoelectric actuator 100 according to the embodiment of the present disclosure may also be used as a driver in a periscope camera module, which is not limited in the present disclosure.

Exemplary Camera Module

Figure 9:
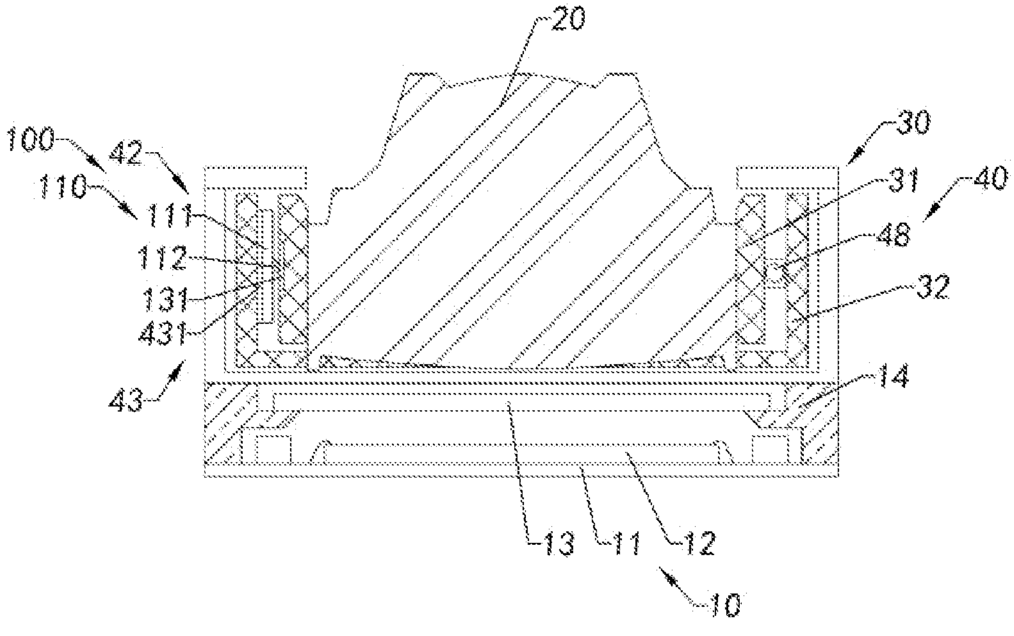
FIG. 9 illustrates a schematic view of a camera module according to an embodiment of the present disclosure.

As shown in FIG. 9, a camera module according to an embodiment of the present disclosure is explained. The camera module includes a photosensitive assembly 10, an optical camera lens 20 held on a photosensitive path of the photosensitive assembly 10, a frame carrier assembly 30, and a driving assembly 40 for driving the optical camera lens 20 for optical image stabilization.

Figure 10:
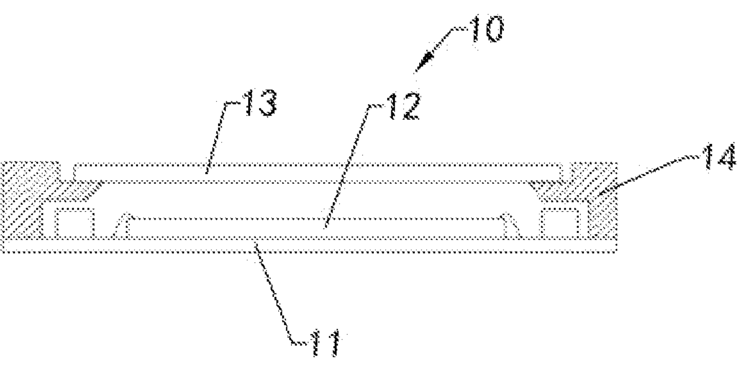
FIG. 10 illustrates a schematic view of a photosensitive assembly of the camera module according to the embodiment of the present disclosure.

As shown in FIG. 10, in this embodiment, the photosensitive assembly 10 includes a circuit board 11, a photosensitive chip 12 electrically connected to the circuit board 11, and a filter element 13 held on the photosensitive path of the photosensitive chip 12, wherein the circuit board 11 forms a mounting substrate of the photosensitive assembly 10. The circuit board may be designed as a Printed Circuit Board (PCB), a software combination board, or a reinforced Flexible Printed Circuit (PFC). Moreover, in some examples, a reinforcing plate (not shown) may also be arranged below the circuit board 11. For example, a steel sheet is arranged below the circuit board, so as to strengthen the strength of the circuit board and improve the heat dissipation performance of the photosensitive assembly through the steel sheet.

Further, in an example illustrated in FIG. 10, the photosensitive assembly 10 further includes a bracket 14 arranged on the circuit board 11, wherein the filter element 13 is mounted on the bracket 14 to be held on the photosensitive path of the photosensitive chip 12. In other examples of the present disclosure, a specific implementation that the filter element 13 is held on the photosensitive path of the photosensitive chip 12 is not limited in the present disclosure. For example, the filter element 13 may be designed as a filter film and coated on the surface of a certain optical lens element of the optical camera lens to play the effect of light filtering. For another example, the photosensitive assembly 10 may further include a filter element bracket mounted on the bracket 14 (not shown), wherein the filter element 13 is held on the photosensitive path of the photosensitive chip 12 by being mounted on the filter element bracket.

In a specific example of the embodiment of the present disclosure, the bracket 14 may be designed as a plastic bracket, which is attached to the circuit board 11 by an adhesive. In other examples of the embodiment of the present disclosure, the bracket 14 may also be designed as an integrated bracket integrally formed on the circuit board 11, such as a molded bracket, which is not limited in the present disclosure.

As shown in FIG. 9, in the embodiment of the present disclosure, the frame carrier assembly 30 is mounted on the photosensitive assembly 10, wherein the frame carrier assembly 30 includes an outer frame carrier 33 mounted on the bracket 14, a second frame carrier 32 accommodated in the outer frame carrier 33 and the first frame carrier 31 accommodated in the second frame carrier 32. That is, in this embodiment, the frame carrier assembly includes a first frame carrier 31, a second frame carrier 32 externally arranged on the first frame carrier 31, and an outer frame carrier 33 externally arranged on the second frame carrier 32.

Particularly, in this embodiment, the optical camera lens 20 is mounted in the first frame carrier 31. In this way, the optical camera lens 20 is held on the photosensitive path of the photosensitive assembly 10. That is, in this embodiment, the first frame carrier 31 forms a mounting carrier of the optical camera lens.

Moreover, in the embodiment of the present disclosure, there is a gap between the second frame carrier 32 and the outer frame carrier 33, and there is a gap between the first frame carrier 31 and the second frame carrier 32. That is, there is an available space between the second frame carrier 32 and the outer frame carrier 33, wherein the available space can be used to mount a driver for driving the second frame carrier 32 to move. There is an available space between the first frame carrier 31 and the second frame carrier 32, wherein the available space can be used to mount a driver for driving the first frame carrier 31 to move. Here, the selection and installation of the driver will be explained in more detail in the subsequent description.

As shown in FIG. 9, in the embodiment of the present disclosure, the optical lens 22 includes a lens barrel 21 and at least one optical lens 22 mounted in the lens barrel 21. It should be known by those skilled in the art that the resolution of the optical camera lens 20 is directly proportional to the number of optical lenses 22 within a certain range, that is, the higher the resolution, the more the number of optical lenses 22. In a specific implementation, the optical camera lens 20 may be designed as an integrated camera lens, or a split camera lens, wherein when the optical camera lens 20 is designed as an integrated camera lens, the optical camera lens 20 includes a lens barrel 21, and all of the optical lenses 22 are mounted in the lens barrel 21; and when the optical camera lens 20 is designed as a split optical camera lens, the optical camera lens 20 is assembled from at least two camera lens units.

As described previously, in order to meet the increasingly widespread market demands, high pixels, large chips and small sizes are irreversible development trends of the existing camera modules. With the development of photosensitive chips in the direction of high pixels and large chips, the size of optical components (such as filter elements, and optical camera lenses) that are compatible with photosensitive chips is also gradually increasing, which brings new challenges to driving elements used to drive the optical components for optical performance adjustment (e.g., optical focus, optical image stabilization, etc.).

Specifically, existing driving elements for driving optical components are electromagnetic motors, such as Voice Coil Motors (VCM), Shape Memory Alloy Actuators (SMA), etc. However, as the size of optical components increases, resulting in an increase in weight, the existing electromagnetic motors are gradually unable to provide sufficient driving force to drive the optical components to move. Quantitatively, existing voice coil motors and shape memory alloy drivers are only suitable for driving an optical component with a weight less than 100 mg. That is, if the weight of the optical camera lens exceeds 100 mg, the existing drivers will not be able to meet the application requirements of camera modules.

In addition, as mobile terminal devices are becoming smaller and thinner, the density of component layout inside the driving element has also increased. Correspondingly, the existing voice coil motor is internally provided with a coil and magnets. When the distance between two magnets is too close (less than 7 mm), their internal magnetic fields will interact with each other, resulting in displacement or vibration of the magnets, and reducing the stability of its drive control.

Therefore, an adapted new driving solution for camera modules is needed. The new driver can not only meet the driving requirements of the camera module for optical performance adjustment, but also meet the development requirements of lightness and thinness of the camera module.

That is, for a camera module, a new driver needs to meet the following requirements: relatively larger driving force, and better driving performance (specifically including: higher accuracy driving control and longer driving stroke). At the same time, in addition to seeking a driver that meets the requirements of new technologies, when selecting a new driver, it is also necessary to consider that the selected driver can adapt to the current development trend of lightness and thinness of the camera module.

After research and testing, the present disclosure provides a piezoelectric actuator with a new structure, which can meet the technical requirements of the camera module for the driver. Moreover, the piezoelectric actuator is further arranged in the camera module in a suitable arrangement, so that it meets the structural and dimensional design requirements of the camera module.

Figure 12A:
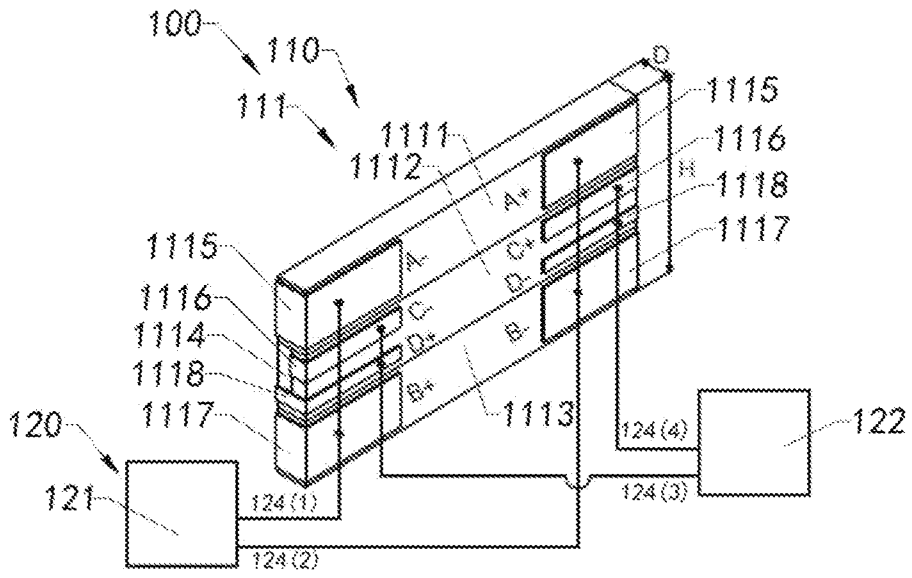
FIG. 12A illustrates a schematic view of a piezoelectric actuator according to an embodiment of the disclosure.

FIGS. 12A to 12L illustrate schematic views of a piezoelectric actuator according to an embodiment of the disclosure. As shown in FIG. 12A, the piezoelectric actuator 100 according to the embodiment of the present disclosure includes an actuating system 110 and a driving circuit system 120, wherein the actuating system 110 moves in a two-dimensional trajectory along a preset direction in a manner of bending vibration along two directions under the control of the driving circuit system 120. In particular, in this embodiment, the piezoelectric actuator 100 is a high-efficiency semi-resonant driving system. After being turned on, the actuating system 110 of the piezoelectric actuator 100 moves in the two-dimensional trajectory along the preset direction in a manner of bending vibration along two directions to frictionally couple and move the acted object along the preset direction.

As shown in FIG. 12A, in this embodiment, the actuating system 110 includes a piezoelectric plate structure 111 and a friction driving portion 112 fixed to the piezoelectric plate structure 111. Here, the piezoelectric plate structure 111 may be symmetrical, or may also be asymmetrical. The piezoelectric plate structure 111 has a first side surface extending along its depth direction and a second side surface extending along its height direction and adjacent to the first side surface, wherein the piezoelectric plate structure 111 has a first resonance frequency along its depth direction (e.g., D as illustrated in FIG. 12A) and a second resonance frequency along its height direction (e.g., H as illustrated in FIG. 12A). Usually, the height dimension of the piezoelectric plate structure 111 is greater than its depth dimension, that is, the second resonance frequency is greater than the first resonance frequency.

Figure 12B:
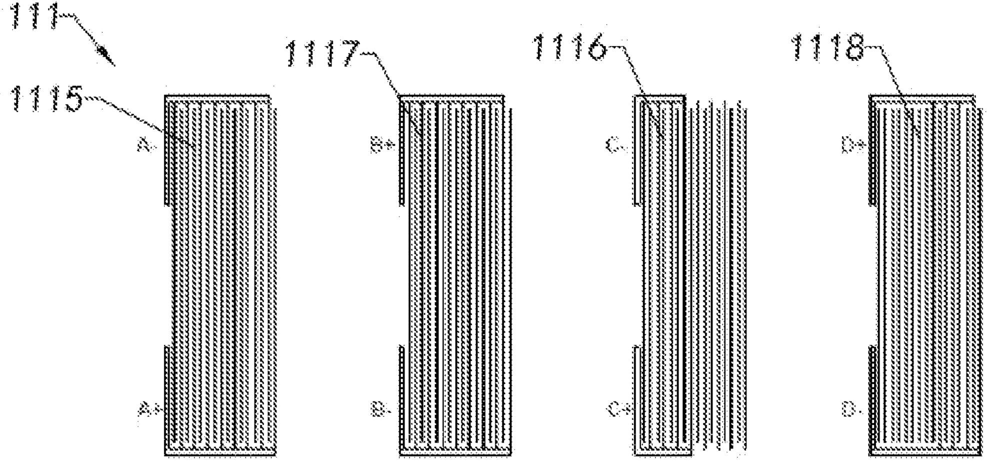
FIG. 12B illustrates a schematic view of a piezoelectric plate structure of the piezoelectric actuator according to the embodiment of the present disclosure.

As shown in FIG. 12B, in this embodiment, the piezoelectric plate structure 111 includes at least one piezoelectric layer formed together. The thickness dimension of the piezoelectric plate structure 111 is in the range of 5 um to 40 um. In particular, in the embodiment of the present disclosure, the at least one piezoelectric layer structure may be a single piezoelectric layer, or may also include a plurality of piezoelectric layers stacked together (for example, a plurality of parallel piezoelectric layers co-fired together). Here, compared with the single piezoelectric layer, the plurality of piezoelectric layers can achieve similar effects by applying a smaller voltage.

As shown in FIG. 12A, in this embodiment, the piezoelectric plate structure 111 includes a first piezoelectric region 1111, a second piezoelectric region 1112 and a third piezoelectric region 1113 formed on the second side surface, and a fourth piezoelectric region 1114 formed on the first side surface, wherein the second piezoelectric region 1112 is located between the first piezoelectric region 1111 and the third piezoelectric region 1113, and the fourth piezoelectric region 1114 is adjacent to the second piezoelectric region 1112. Moreover, the piezoelectric plate structure 111 further includes a first electrode pair 1115 electrically connected to the first piezoelectric region 1111, a second electrode pair 1116 electrically connected to the second piezoelectric region 1112, a third electrode pair 1117 electrically connected to the third piezoelectric region 1113 and a fourth electrode pair 1118 electrically connected to the fourth piezoelectric region 1114. That is, in the example illustrated in FIG. 9, the piezoelectric plate structure 111 includes 4 piezoelectric regions and four electrode pairs that are electrically connected to the 4 piezoelectric regions, respectively. Of course, in other examples of the present disclosure, the piezoelectric plate structure 111 may include other numbers of piezoelectric regions and electrode pairs, which is not limited in the present disclosure.

Moreover, in some other examples of the present disclosure, one piezoelectric region of the first piezoelectric region 1111 and the third piezoelectric region 1113, and/or, one piezoelectric region of the second piezoelectric region 1112 and the fourth piezoelectric regions 1114 may be passive, which can reduce the driving amplitude without changing the operation of the actuating system 110.

Further, in the embodiment of the present disclosure, the first piezoelectric region 1111, the second piezoelectric region 1112, the third piezoelectric region 1113 and the fourth piezoelectric region 1114 have polarities generated by polarization during the manufacturing process, thereby forming positive and negative electrodes. Specifically, the first piezoelectric region 1111 is polarized during the manufacturing process, so that one electrode of the first electrode pair 1115 corresponding to the first piezoelectric region 1111 forms a negative electrode (e.g., A− as illustrated in FIG. 12A), and the other electrode forms a positive electrode (e.g., A+ as illustrated in FIG. 12A); the third piezoelectric region 1113 is polarized during the manufacturing process, so that one electrode of the third electrode pair 1117 corresponding to the third piezoelectric region 1113 forms a negative electrode (e.g., B− as illustrated in FIG. 12A), and the other electrode forms a positive electrode (e.g., B+ as illustrated in FIG. 12A); the second piezoelectric region 1112 is polarized during the manufacturing process, so that one electrode of the second electrode pair 1116 corresponding to the second piezoelectric region 1112 forms a negative electrode (e.g., C− as illustrated in FIG. 12A), and the other electrode forms a positive electrode (e.g., C+ as illustrated in FIG. 12A); and the fourth piezoelectric region 1114 is polarized during the manufacturing process, so that one electrode of the fourth electrode pair 1118 corresponding to the fourth piezoelectric region 1114 forms a negative electrode (e.g., D− as illustrated in FIG. 12A), and the other electrode forms the positive electrode (e.g., D+ as illustrated in FIG. 12A). It should be noted that in this embodiment, each electrode in the first electrode pair 1115 and/or the second electrode pair 1116 and/or the third electrode pair 1117 and/or the second electrode pair 1116 has an "L" shape.

As shown in FIGS. 12A and 12B, in this embodiment, one electrode of the first electrode pair 1115 is coupled to and alternatively connected to one internal electrode of each piezoelectric layer of the first piezoelectric region 1111, and the other electrode of the first electrode pair 1115 is alternatively connected to an internal electrode of the first piezoelectric region 1111 opposite to each piezoelectric layer, wherein during the polarization process, one electrode of the first electrode pair 1115 is determined as a positive electrode and the other is determined as a negative electrode. One electrode of the second electrode pair 1116 is coupled to and alternatively connected to an internal electrode of each piezoelectric layer of the second piezoelectric region 1112, and the other electrode of the second electrode pair 1116 is alternatively connected to an internal electrode of the second piezoelectric region 1112 opposite to each piezoelectric layer, wherein during the polarization process, one electrode of the second electrode pair 1116 is determined as a positive electrode and the other electrode is determined as a negative electrode. One electrode of the third electrode pair 1117 is coupled to and alternatively connected to an internal electrode of each piezoelectric layer of the third piezoelectric region 1113, and the other electrode of the third electrode pair 1117 is alternatively connected to an internal electrode of the third piezoelectric region 1113 opposite to each piezoelectric layer, wherein during the polarization process, one electrode of the third electrode pair 1117 is determined as a positive electrode and the other electrode is determined as a negative electrode. One electrode of the third electrode pair 1117 is coupled to and alternatively connected to an internal electrode of each piezoelectric layer of the third piezoelectric region 1113, and the other electrode of the third electrode pair 1117 is alternatively connected to an internal electrode of the third piezoelectric region 1113 opposite to each piezoelectric layer, wherein during the polarization process, one electrode of the third electrode pair 1117 is determined as a positive electrode and the other electrode is determined as a negative electrode.

Further referring to FIG. 12A, in this embodiment, the driving circuit system 120 includes a first driving circuit 121 and a second driving circuit 122, the first driving circuit 121 is electrically connected to the first electrode pair 1115 and the third electrode pair 1117, and the second driving circuit 122 is electrically connected to the second electrode pair 1116 and the fourth electrode pair 1118, wherein the first driving circuit 121 and the second driving circuit 122 may be a full-bridge driving circuit, or may also be other driving circuits. In particular, in this embodiment, the driving circuit system 120 has four types of output circuit vibration signals: 124(1) to 124(4), wherein the output circuit vibration signal may be an ultrasonic square wave vibration signal as shown in FIG. 12, or may also be other signals, for example, a sinusoidal signal.

When the piezoelectric actuator 100 is working, the piezoelectric plate structure 111 has two bending modes:

mode 1 and mode 2, wherein mode 1 and mode 2 each have a different resonance frequency. The vibration amplitude of the bending mode of the piezoelectric plate structure 111 depends on the vibration frequency of the output circuit vibration signal. Specifically, when the driving circuit system 120 applies a circuit vibration signal to the piezoelectric plate structure 111 at the resonance frequency of one of the two bending modes (for example, the resonance frequency of mode 1), the vibration amplitude is completely amplified for the bending mode operating at its resonance frequency and only partially amplified for the other bending mode operating at partial resonance. More clearly, when the vibration frequency of the circuit vibration signal output by the first driving circuit 121 is the first resonance frequency, the piezoelectric plate structure 111 resonates in its height direction and partially resonates in its depth direction, so that the piezoelectric plate structure 111 moves in a two-dimensional trajectory along a preset direction in a manner of bending vibration along two directions; and wherein when a vibration frequency of a circuit vibration signal input by the second driving circuit 122 is the second resonance frequency, the piezoelectric plate structure 111 resonates in its depth direction and partially resonates in its height direction, so that the piezoelectric plate structure 111 moves in a two-dimensional trajectory along a preset direction in a manner of bending vibration along two directions.

Figure 12C:
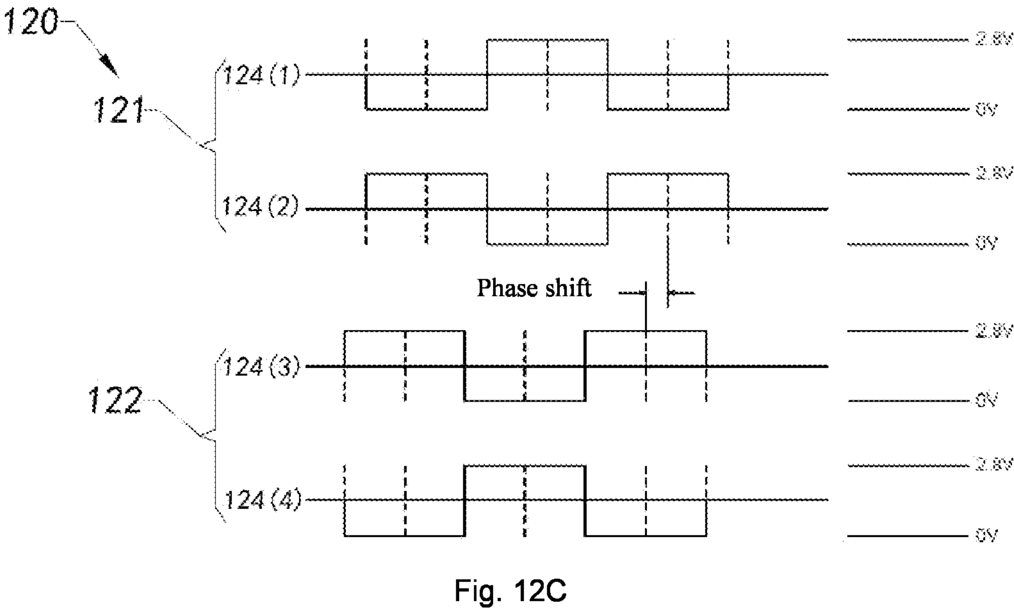
FIG. 12C illustrates a schematic diagram of output signals of the driving circuit system of the piezoelectric actuator according to the embodiment of the present disclosure.

More specifically, in the example illustrated in FIGS. 12A and 12C, the first driving circuit 121 and the second driving circuit 122 can output 4 types of circuit vibration signals: 124(1) to 124(4). In this embodiment, the voltage of the circuit vibration signal is 2.8 V, and the 4 vibration signals each have a vibration frequency, which is substantially equal to the resonance frequency of any one of the two bending modes of the piezoelectric plate structure 111. That is, the vibration frequency is substantially equal to the first resonance frequency or the second resonance frequency. In addition, the circuit vibration signals from outputs 124(1) to 124(2) are phase-shifted by the driving circuit system 120 by about 0 to 90 degrees relative to the circuit vibration signals from outputs 124(3) to 124(4), thereby moving along one of two directions. When the driving circuit system 120 adjusts the phase shift of outputs 124(1) to 124(2) relative to the outputs 124(3) to 124(4) to about −180 to −90 degrees, so as to move a movable member along an opposite direction (i.e., another opposite direction of the two directions).

Figure 12D:
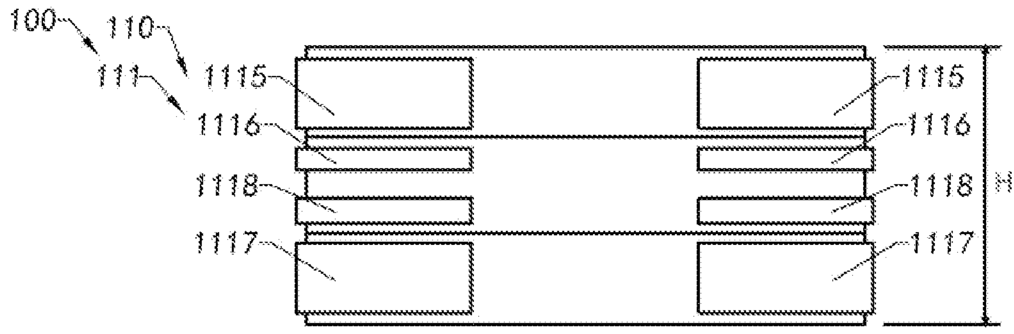
FIGS. 12D to 12F illustrate schematic views of the piezoelectric actuator according to the embodiment of the present disclosure moving in a first mode.
Figure 12E:
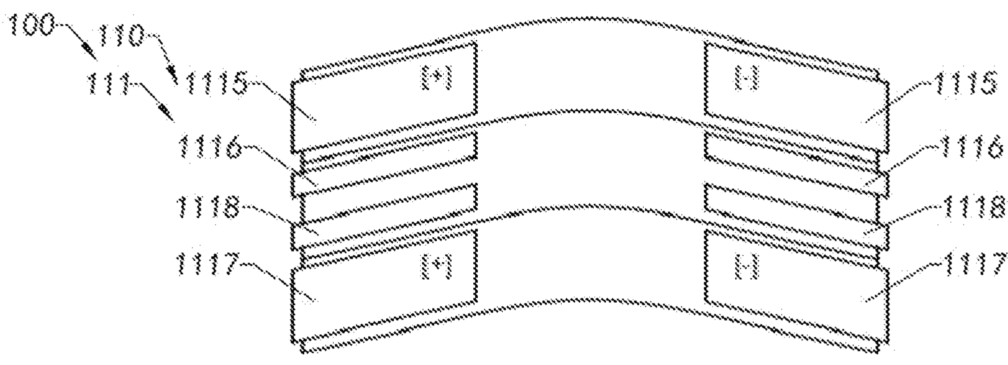
Figure 12F:
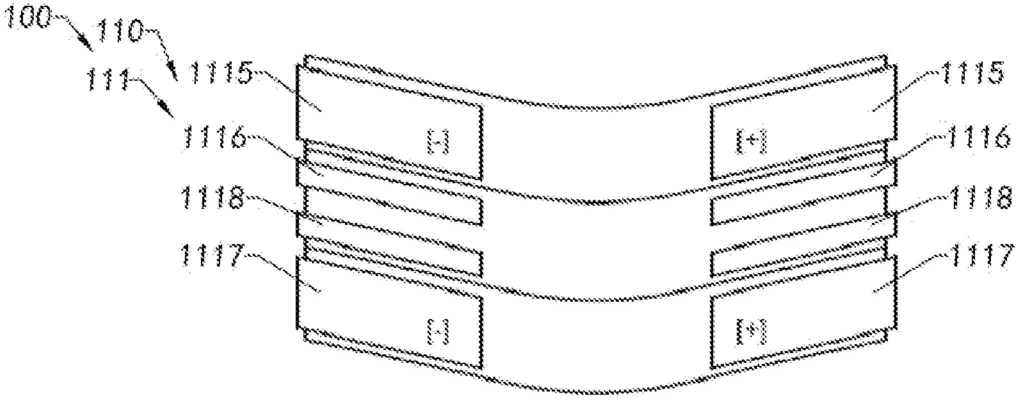

FIGS. 12D to 12F illustrate schematic views of the piezoelectric actuator 100 according to the embodiment of the present disclosure moving in a first mode. As shown in FIGS. 12D to 12F, the bending mode is generated due to the application of circuit vibration signals from outputs 124(1)-124(2) of different stages to the first piezoelectric region 1111 and the third piezoelectric region 1113 having opposite polarities. When the piezoelectricity of all electrodes is 0, FIG. 12D shows a situation when the piezoelectric plate structure 111 is stationary. When the voltage difference between outputs 124(1) and 124(2) is positive, the length of the first piezoelectric region 1111 increases and the length of the third piezoelectric region 1113 decreases so that the piezoelectric plate is bent as shown in FIG. 12E. When the voltage difference between outputs 124(1) and 124(2) is negative, the length of the first piezoelectric region 1111 decreases and the length of the third piezoelectric region 1113 increases so that the piezoelectric plate structure is bent as shown in FIG. 12F.

Figure 12G:
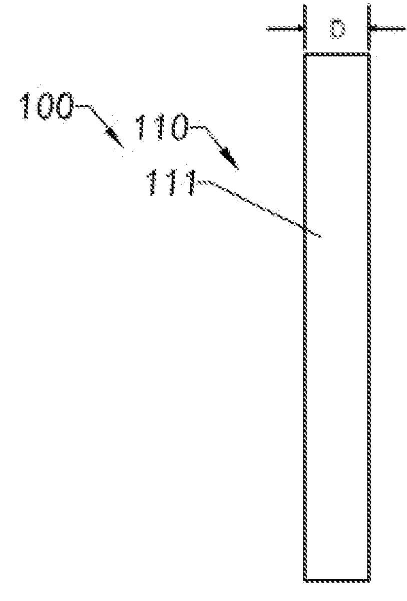
FIGS. 12G to 12I illustrate schematic diagrams of the piezoelectric actuator according to the embodiment of the present disclosure moving in a second mode.
Figure 12H:
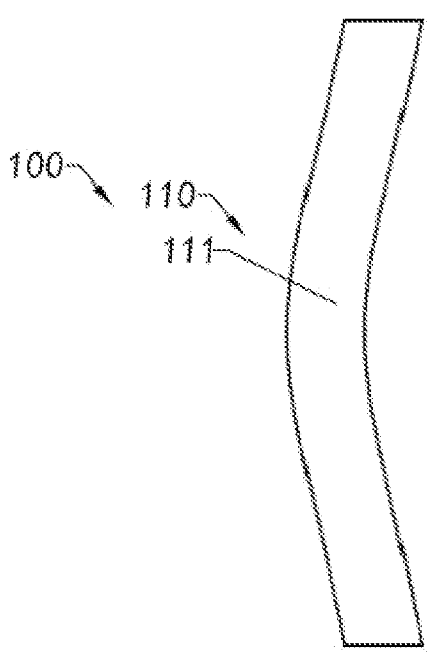
Figure 12I:
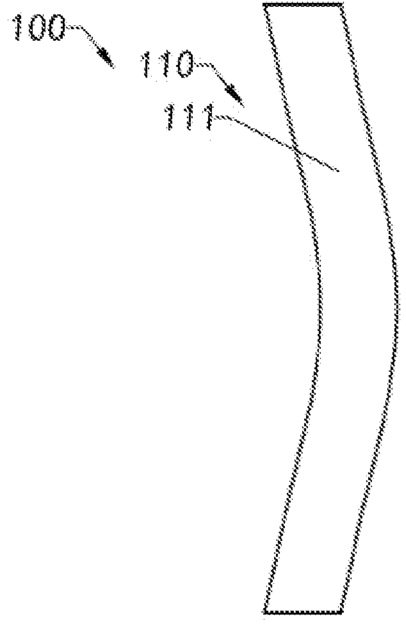

FIGS. 12G to 12I illustrate schematic views of the piezoelectric actuator 100 according to the embodiment of the present disclosure moving in a second mode.

As shown in FIGS. 12G to 12I, the bending mode is generated due to the application of vibration signals from outputs 124(3)-124(4) of different stages to the second piezoelectric region 1112 and the fourth piezoelectric region 1114 having opposite polarities. When the piezoelectricity of all electrodes is 0, FIG. 12G shows a situation when the piezoelectric plate structure 111 is stationary. When the voltage difference between outputs 124(3) and 124(4) is positive, the length of the second piezoelectric region 1112 decreases and the length of the fourth piezoelectric region 1114 increases so that the piezoelectric plate structure 111 is bent as shown in FIG. 12H. When the voltage difference between outputs 124(3) and 124(4) is negative, the length of the second piezoelectric region 1112 increases and the length of the fourth piezoelectric region 1114 decreases so that the piezoelectric plate structure is bent as shown in FIG. 12I.

Correspondingly, when the output circuit vibration signal as shown in FIG. 11 is applied to the actuating system 110, the actuating system 110 forms a two-dimensional trajectory with an elliptical orbital shape, that is, the driving circuit system 120 can control, according to a phase difference, the direction of rotation of the actuating system 110 on the elliptical orbital path, so that the actuating system 110 cam drive the acted object at a relatively smaller and more precise step speed.

Figure 12J:
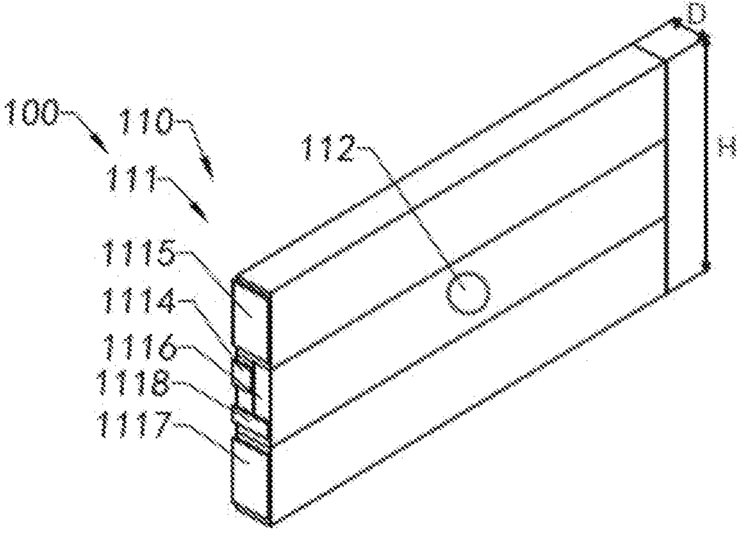
FIG. 12J illustrates another schematic view of the piezoelectric plate structure of the piezoelectric actuator according to the embodiment of the present disclosure.
Figure 12K:
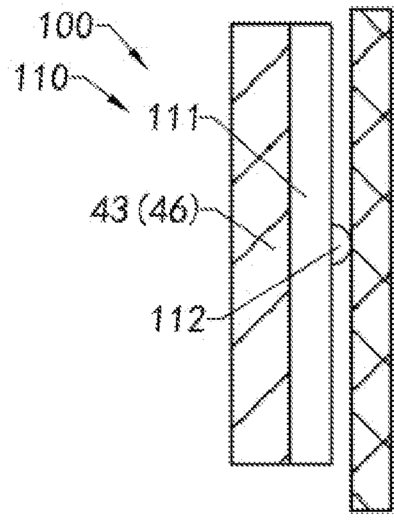
FIG. 12K illustrates a schematic view of the piezoelectric actuator according to the embodiment of the present disclosure acting on a moved object.
Figure 12L:
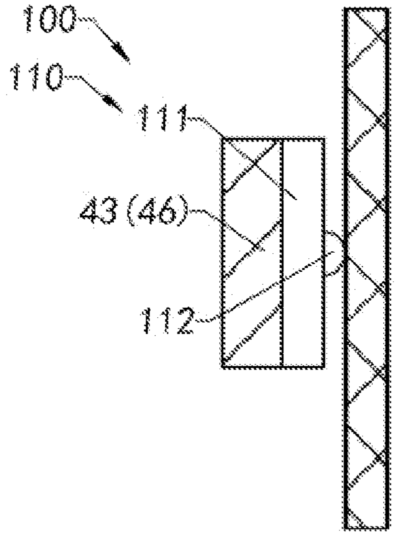
FIG. 12L illustrates a schematic view of movement of the piezoelectric actuator according to the embodiment of the present disclosure.

FIG. 12J illustrates another schematic view of the piezoelectric plate structure 111 of the piezoelectric actuator 100 according to the embodiment of the present disclosure. As shown in FIG. 12J, in the embodiment of the present disclosure, the actuating system 110 further includes a friction driving portion 112 fixed to the piezoelectric plate structure 111, wherein the friction driving portion 112 is suitable for being frictionally coupled to the acted object to move the acted object along a predetermined direction by friction. In order to enable the friction driving portion 112 to be frictionally coupled to the acted object, as shown in FIG. 12K, during the installation process, a prepressing component 43/46 is configured for the piezoelectric actuator 100, and the prepressing component 43/46 provides a prepressing force between the piezoelectric actuator 100 and the acted object, so that the friction driving portion 112 of the piezoelectric actuator 100 can be frictionally coupled to the acted object, so as to bring the acted object to move along a predetermined direction by friction, as shown in FIG. 12L.

In particular, in this embodiment, the friction driving portion 112 includes at least one contact pad, which may be fixed to the piezoelectric plate structure 111 along the depth direction, or may also be fixed to the piezoelectric plate structure 111 along the height direction. In this embodiment, the at least one contact pad may have a hemispherical shape. Of course, it may also be in other shapes, for example, a semi-cylindrical shape, a platform, a rectangle, or the like. Preferably, the at least one contact pad is made of a material with better friction performance and durability. For example, it may be made of a metal oxide material (for example, zirconia, alumina or the like).

It is worth mentioning that, compared with a traditional electromagnetic driver, the piezoelectric actuator 100 has the advantages of small size, large driving force and high accuracy. Quantitatively, the piezoelectric actuator 100 according to the embodiment of the present disclosure can provide a driving force ranging from 0.6 N to 2 N, which is sufficient to drive a component with a weight more than 100 mg.

In addition to being able to provide a relatively large driving force, the piezoelectric actuator 100 also has other advantages over the traditional electromagnetic motor scheme and memory alloy motor scheme, including but not limited to: a relatively small size (with a slender shape), better response accuracy, a relatively simpler structure, relatively simpler driving control, high product consistency, no electromagnetic interference, a relatively larger stroke, short stabilization time, a relatively smaller weight, etc.

Specifically, the camera module requires that the configured driver has characteristics such as a long driving stroke and good alignment accuracy. In the existing voice coil motor scheme, in order to ensure the linearity of motion, it is necessary to design additional guide rods or ball guide rails; it is also necessary to adapt large-sized driving magnets/coils at the side part of the camera lens; and it is also necessary to set up auxiliary positioning devices such as balls, spring leaf, and suspension wires. In order to accommodate more components, ensure the structural strength and reserve structural gaps, it often leads to the larger lateral dimension of the module, the complicated structural design, and the heavier weight of the module. The memory alloy motor scheme is limited by the relatively small stroke that the memory alloy scheme can provide in the same proportion, and there are also reliability risks such as potential disconnection.

The piezoelectric actuator 100 has a relatively simple structure, and the assembly structure is simpler. In addition, the size of its elements is substantially unrelated to the size of the motion stroke of the piezoelectric actuator 100. Therefore, the piezoelectric actuator 100 can realize the advantages of large driving force, small size, and small weight in optical image stabilization products. Also, it is designed to match a larger stroke or a heavier component weight, and the integration degree in the design is also higher.

Further, the piezoelectric actuator 100 pushes the object to be pushed to perform micron-scale motion in a frictional contact manner. Compared with the non-contact manner of driving the object to be pushed in the electromagnetic scheme, in which it needs to rely on electromagnetic force to counteract gravity and frictional force, it has the advantages of greater driving force, greater displacement and lower power consumption, also has higher control accuracy, and can realize high-accuracy optical image stabilization. Moreover, when there are a plurality of motor mechanisms, the piezoelectric actuator 100 does not have a magnet coil structure, so there is no magnetic interference problem. In addition, the piezoelectric actuator 100 can be self-locked by relying on the frictional force between the components, and thus, the vibration and noise of the camera module during optical image stabilization can be reduced.

Figure 11A:
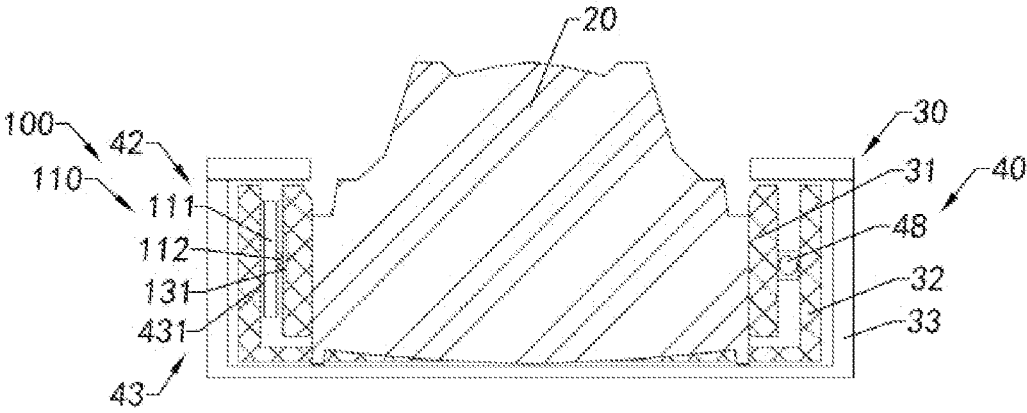
FIG. 11A illustrates a first schematic view of an optical camera lens, a frame carrier assembly and a driving assembly of the camera module according to the embodiment of the present disclosure.
Figure 15:
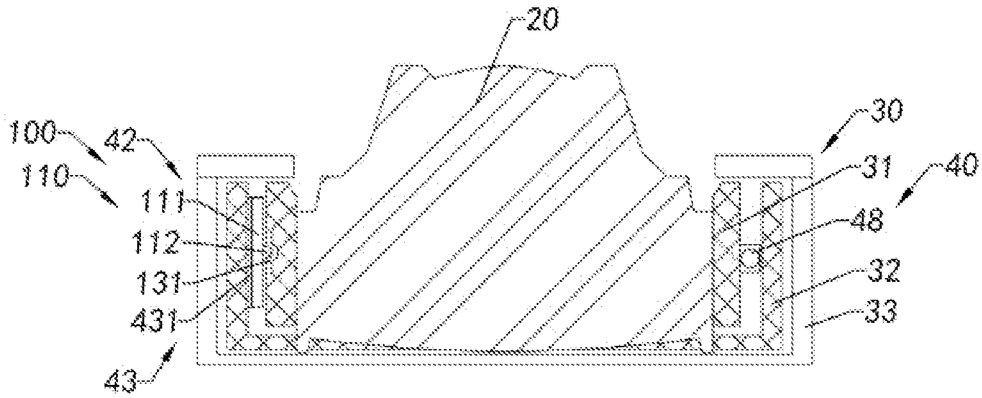
FIG. 15 illustrates a schematic view of still another variant of the camera module according to the embodiment of the present disclosure.

After the piezoelectric actuator 100 is selected as a driver to drive the photosensitive assembly 10 for optical image stabilization, specifically, as shown in FIGS. 11A and 15, in this embodiment, the driving assembly 40 includes a first driving element 42, a first prepressing component 43, a second driving element 45, and a second prepressing component 46, wherein the first driving element 42 and the second driving element 45 are designed as the piezoelectric actuator 100.

Correspondingly, as shown in FIGS. 11A and 15, in this embodiment, the optical camera lens 20 is mounted to the first frame carrier 31, the first driving element 42 is frictionally coupled to the first frame carrier 31 through the first prepressing component 43, and is configured to, after being driven, move along a first direction in a two-dimensional trajectory in a plane perpendicular to the optical axis in a manner of bending vibration along two directions, and thereby drive the first frame carrier 31 by friction, so as to bring the optical camera lens 20 to move in the plane perpendicular to the optical axis for optical image stabilization in the first direction. The second frame carrier 32 is externally arranged on the first frame carrier 31, wherein the second driving element 45 is frictionally coupled to the second frame carrier 32 through the second prepressing component 46, and is configured to, after being driven, move along a second direction in a two-dimensional trajectory in a plane perpendicular to the optical axis in a manner of bending vibration along two directions, and thereby drive the second frame carrier 32 by friction, so as to bring the first frame carrier 31 to bring the optical camera lens 20 to move in the plane perpendicular to the optical axis for optical image stabilization in a second direction, the first direction being perpendicular to the second direction. In one example, the first direction is an X-axis direction, and the second direction is a Y-axis direction.

Here, the first driving element 42 being frictionally coupled to the first frame carrier 31 includes: the first driving element 42 directly frictionally interacting with the first frame carrier 31, and the first driving element 42 indirectly frictionally interacting with the first frame carrier 31 (that is, although there is no direct friction force between the first driving element 42 and the first frame carrier 31, the friction driving force generated by the first driving element 42 can act on the first frame carrier 31). Correspondingly, the second driving element 45 being frictionally coupled between the second frame carrier 32 and the outer frame carrier 33 includes: the second driving element 45 directly frictionally interacting with the second frame carrier 32, and the second driving element 45 indirectly frictionally interacting with the second frame carrier 32 (that is, although there is no direct friction force between the second driving element 45 and the second frame carrier 32, the frictional driving force generated by the second driving element 44 can act on the second frame carrier 32)

Figure 11B:
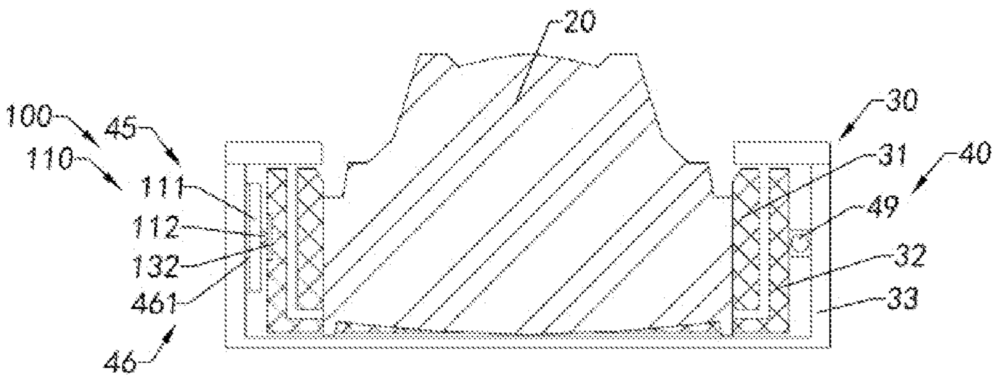
FIG. 11B illustrates a second schematic view of the optical camera lens, the frame carrier assembly and the driving assembly of the camera module according to the embodiment of the present disclosure.
Figure 11C:
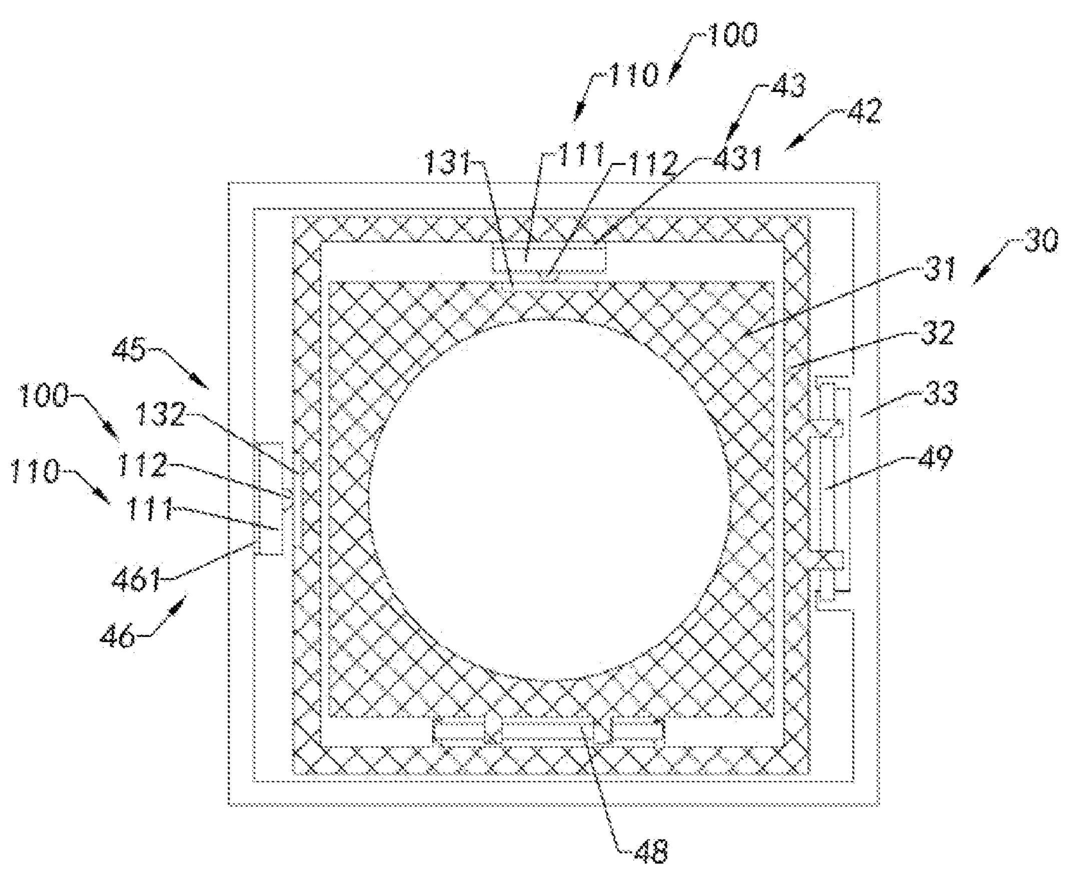
FIG. 11C illustrates a third schematic view of the optical camera lens, the frame carrier assembly and the driving assembly of the camera module according to the embodiment of the present disclosure.

More specifically, in this embodiment, as shown in FIGS. 11A to 11C, the first driving element 42 is sandwiched between the first frame carrier 31 and the second frame carrier 32 through the first prepressing component 43. In this way, the first driving element 42 is frictionally coupled to the first frame carrier 31.

Correspondingly, in this embodiment, the first prepressing component 43 includes a first elastic element 431, and the first elastic element 431 is arranged between the piezoelectric plate structure 111 of the first driving element 42 and the second frame carrier 32, so as to force the first driving element 42 to be frictionally coupled to the first frame carrier 31 through an elastic force of the first elastic element 431. In this embodiment, the friction driving portion 112 of the first driving element 42 is directly in contact with the surface of the outer side wall of the first frame carrier 31, and correspondingly, the elastic force provided by the first elastic element 431 can force the friction driving portion 112 of the first driving element 42 to be in contact with the surface of the outer side wall of the first frame carrier 31 to form a frictional contact relationship between the two. In this way, after the first driving element 42 is turned on, the friction driving portion 112 of the first driving element 42 can drive the first frame carrier 31 to move along the first direction by means of friction driving, so as to bring the optical camera lens 20 to move along the first direction for optical image stabilization in the first direction.

In a specific example of the present disclosure, the first elastic element 431 is designed as an adhesive having elasticity, that is, the first elastic element 431 is designed as glue having elasticity after being cured. Correspondingly, during the installation process, a layer of adhesive with a thickness of 10 um to 50 um may be applied between the surface of the inner side wall of the second frame carrier 32 and the piezoelectric plate structure 111 of the first driving element 42, so as to form the first elastic element 431 arranged between the piezoelectric plate structure 111 of the first driving element 42 and the second frame carrier 32 after the adhesive is cured and molded. It should be understood that, in this example, the first elastic element 431 can also enable the first driving element 42 to be fixed on the surface of the inner side wall of the second frame carrier 32 while providing the prepressing force. Preferably, the first elastic element 431 has relatively high flatness, that is, when applying the adhesive, it is ensured as much as possible that the applied adhesive has relatively high flatness and uniformity, and the use of an adhesive with a thickness of 10 um to 50 um can improve the flatness of the adhesive, so that the first driving element 42 can be flatly fixed on the surface of the inner side wall of the second frame carrier 32, thereby improving the driving stability of the first driving element 42.

Correspondingly, in this embodiment, as shown in FIGS. 11A to 11C, the second driving element 45 is sandwiched between the second frame carrier 32 and the outer frame carrier 33 through the second prepressing component 46. In this way, the second driving element 45 is frictionally coupled to the second frame carrier 32.

Further, as shown in FIGS. 11A to 11C, in this embodiment, the second prepressing component 46 includes a second elastic element 461, and the second elastic element 461 is arranged between the piezoelectric plate structure 111 of the second driving element 45 and the outer frame carrier 33, so as to force the second driving element 45 to be frictionally coupled to the second frame carrier 32 through an elastic force of the second elastic element 461. Correspondingly, in this embodiment, the friction driving portion 112 of the second driving element 45 is directly in contact with the surface of the outer side wall of the second frame carrier 32, and correspondingly, the elastic force provided by the second elastic element 461 can force the friction driving portion 112 of the second driving element 45 to be in contact with the surface of the outer side wall of the second frame carrier 32 to form a frictional contact relationship between the two. In this way, after the second driving element 45 is turned on, the friction driving portion 112 of the second driving element 45 can drive the second frame carrier 32 to move along the second direction by means of friction driving, so as to bring the optical camera lens 20 to move along the second direction for optical image stabilization in the second direction.

In a specific example of the present disclosure, the second elastic element 461 is designed as an adhesive having elasticity, that is, the second elastic element 461 is designed as glue having elasticity after being cured. Correspondingly, during the installation process, a layer of adhesive with a thickness of 10 um to 50 um may be applied between the surface of the inner side wall of the outer frame carrier 33 and the piezoelectric plate structure 111 of the second driving element 45, so as to form the second elastic element 461 arranged between the piezoelectric plate structure 111 of the second driving element 45 and the outer frame carrier 33 after the adhesive is cured and molded. It should be understood that, in this example, the second elastic element 461 can also enable the second driving element 45 to be fixed on the surface of the inner side wall of the outer frame carrier 33 while providing the prepressing force. Preferably, the second elastic element 461 has relatively high flatness, that is, when applying the adhesive, it is ensured as much as possible that the applied adhesive has relatively high flatness and uniformity, and the use of an adhesive with a thickness of 10 um to 50 um can improve the flatness of the adhesive, so that the second driving element 45 can be flatly fixed on the surface of the inner side wall of the outer frame carrier 33, thereby improving the driving stability of the second driving element 45.

It is worth mentioning that, in other embodiments of the present disclosure, the first elastic element 431 and the second elastic element 461 may also be designed as elastic elements without viscosity, for example, rubber with the inherent characteristic of elasticity in the material itself, or a spring or leaf spring that produces elasticity due to deformation, etc., which is also not limited in the present disclosure.

Figure 13:
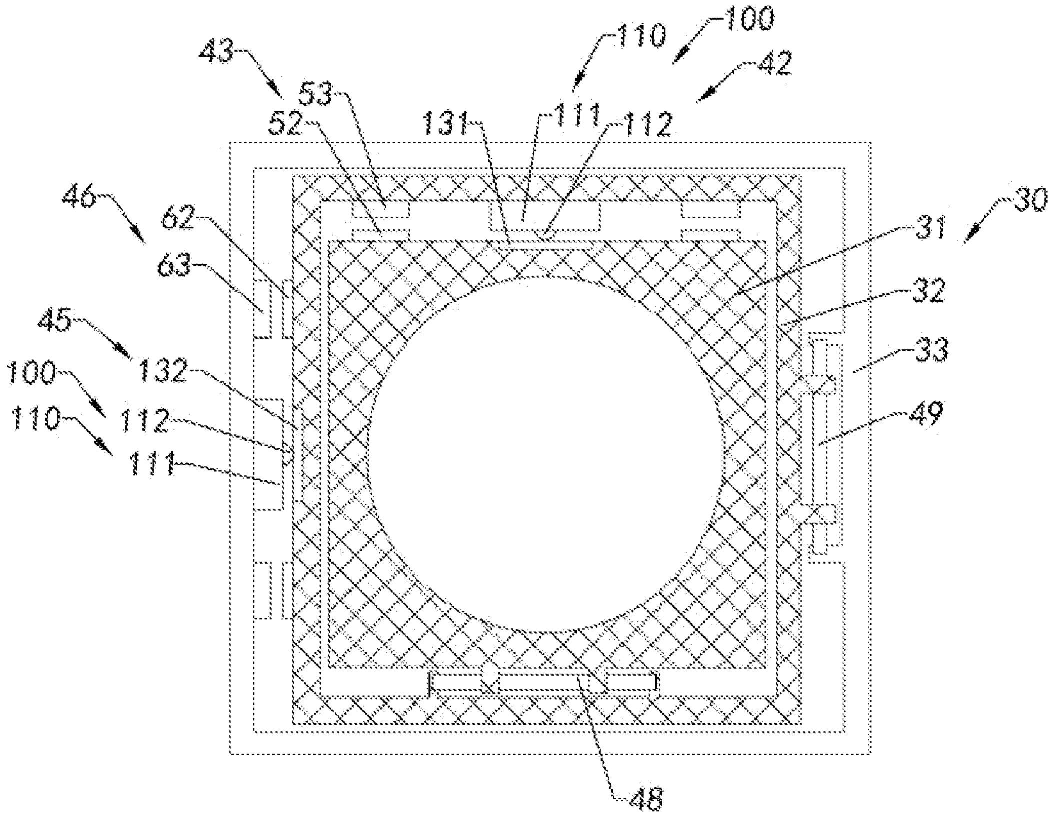
FIG. 13 illustrates a schematic view of a variant of the camera module according to the embodiment of the present disclosure.

It is worth mentioning that, in other variant embodiments of the present disclosure, the structural configuration of the first prepressing component 43 and the second prepressing component 46 may also be adjusted. Specifically, as shown in FIG. 13, in other examples of the present disclosure, the first prepressing component 43 includes a first magnetic attraction element 52 arranged on the first frame carrier 31 and a second magnetic attraction element 53 arranged on the second frame carrier 44 and corresponding to the first magnetic attraction element 52, as so to force the first driving element 42 to be frictionally coupled to the first frame carrier 31 through an magnetic attraction action between the first magnetic attraction element 52 and the second magnetic attraction element 53.

Correspondingly, in this variant, the first magnetic attraction element 52 and the second magnetic attraction element 53 refer to magnetic attraction assemblies that can attract each other. For example, the first magnetic attraction element 52 may be designed as a magnet, and the second magnetic attraction element 53 may be designed as a magnetic component, for example, a material made of a metal such as iron, nickel, cobalt or the like. For another example, the first magnetic attraction element 52 may be designed as a magnet, and the second magnetic attraction element 53 may also be designed as a magnet.

The second prepressing component 46 includes a third magnetic attraction element 62 arranged on the second frame carrier 32 and a fourth magnetic attraction element 63 arranged on the outer frame carrier 33 and corresponding to the third magnetic attraction element 62, as so to force the second driving element 45 to be frictionally coupled to the second frame carrier 32 through an magnetic attraction action between the third magnetic attraction element 62 and the fourth magnetic attraction element 63.

In this variant, the third magnetic attraction element 62 and the fourth magnetic attraction element 63 refer to magnetic attraction assemblies that can attract each other. For example, the third magnetic attraction element 62 may be designed as a magnet, and the fourth magnetic attraction element 63 may be designed as a magnetic component, for example, a material made of a metal such as iron, nickel, cobalt or the like. For another example, the third magnetic attraction element 62 may be designed as a magnet, and the fourth magnetic attraction element 63 may also be designed as a magnet.

In order to enable the first driving element 42 and the second driving element 45 to drive the first frame carrier 31 and the second frame carrier 32 more smoothly, as shown in FIGS. 11A to 11C, the driving assembly 40 further includes a first guiding mechanism 48 arranged between the first frame carrier 31 and the second frame carrier 32 and a second guiding mechanism 49 arranged between the second frame carrier and the outer frame carrier 33, wherein the first guiding mechanism 48 is configured to guide the first frame carrier 31 to move along the first direction, and the second guiding mechanism 49 is configured to guide the second frame carrier 32 to move along the second direction.

More specifically, as shown in FIGS. 11A to 11C, in this embodiment, the first guiding mechanism 48 and the second guiding mechanism 49 are designed as guide rod structures. Correspondingly, the first guiding mechanism 48 includes a first guide rod arranged on the outer side wall of the first frame carrier 31 and extending along the first direction, wherein both ends of the first guide rod are fixed on the inner side wall of the second frame carrier 32. In particular, in this embodiment, the first guide rod and the first driving element 42 are oppositely arranged. Thus, after the first driving element 42 is turned on, the first frame carrier 31 is guided to move along the direction in which the first guide rod extends, so as to improve the movement stability of the first frame carrier 31.

Correspondingly, in this embodiment, the second guiding mechanism 49 includes a second guide rod arranged on the outer side wall of the second frame carrier 32 and extending along the second direction, wherein both ends of the second guide rod are fixed on the inner side wall of the outer frame carrier 33. In particular, in this embodiment, the second guide rod and the second driving element 45 are oppositely arranged. Thus, after the second driving element 45 is turned on, the second frame carrier 32 is guided to move along the direction in which the second guide rod extends, so as to improve the movement stability of the second frame carrier 32.

It is worth mentioning that, in other embodiments of the present disclosure, the first guiding mechanism 48 and the second guiding mechanism 49 may also be realized based on other principles, for example, through a rolling ball-rolling groove mechanism, a slider-sliding groove mechanism, etc., which is not limited in the present disclosure.

In order to optimize the driving performance of the first driving element 42 and the second driving element 45, in the embodiment of the present disclosure, as shown in FIGS. 11A to 11C, the driving assembly 40 further includes a first friction actuating portion 131 and a second friction actuating portion 132, wherein the first friction actuating portion 131 is arranged between the first driving element 42 and the first frame carrier 31, the friction driving portion 112 of the first driving element 42 is in contact with the first friction actuating portion 131 under the action of the first prepressing component 43, and the first friction actuating portion 131 is in contact with the surface of the outer side wall of the first frame carrier 31. In this way, the friction driving force provided by the first driving element 42 can act on the first frame carrier 31 through the first friction actuating portion 131, so as to bring the first frame carrier 31 and the optical camera lens 20 to move along the first direction. That is, in this variant embodiment, the prepressing force between the friction driving portion 112 of the first driving element 42 and the first frame carrier 31 is an indirect prepressing force, that is, although the friction driving portion 112 of the first driving element 42 is not in direct contact with the first frame carrier 31, there is still a prepressing force between the two, so that the friction driving portion 112 of the first driving element 42 can drive the first frame carrier 31 by means of friction driving.

Correspondingly, the second friction actuating portion 132 is arranged between the second driving element 45 and the second frame carrier 32, and the friction driving portion 112 of the second driving element 45 is in contact with the second friction actuating portion 132 under the action of the second prepressing component 46, and the second friction actuating portion 132 is in contact with the surface of the outer wall of the second frame carrier 32. In this way, the friction driving force provided by the second driving element 45 can act on the second frame carrier 32 via the second friction actuating portion 132, so as to bring the second frame carrier 32, the first frame carrier 31 and the optical camera lens 20 to move along the second direction for optical image stabilization in the second direction.

More specifically, as shown in FIGS. 11A to 11C, in this embodiment, the first friction actuating portion 131 has a first surface and a second surface opposite to the first surface, wherein under the action of the first prepressing component 43, the first surface of the first friction actuating portion 131 is in contact with the surface of the outer side wall of the first frame carrier 31, and the second surface is in contact with the end face of at least one of the plurality of friction driving element 121 at the second end. In this way, the friction driving portion 112 of the first driving element 42 is in contact with the first friction actuating portion 131 and the first friction actuating portion 131 is in contact with the first frame carrier 31, so that the friction driving force provided by the first driving element 42 can act on the first frame carrier 31 via the first friction actuating portion 131. Correspondingly, the second friction actuating portion 132 has a third surface and a fourth surface opposite to the third surface, wherein under the action of the second prepressing component 46, the third surface of the second friction actuating portion 132 is in contact with the surface of the outer side wall of the second frame carrier 32, and the fourth surface is in contact with the end surface of at least one of the plurality of friction driving elements 121 at the second end. In this way, the friction driving portion 112 of the second driving element 45 is in contact with the second friction actuating portion 132 and the second friction actuating portion 132 is in contact with the second frame carrier 32, so that the friction driving force provided by the second driving element 45 can act on the second frame carrier 32 via the second friction actuating portion 132.

It is worth mentioning that, although in the embodiment illustrated in FIGS. 11A to 11C, the first friction actuating portion 131 and the second friction actuating portion 132, as a separate component, are arranged between the first driving element 42 and the first frame carrier 31, and between the second driving element 45 and the second frame carrier 32, respectively, for example, the first friction actuating portion 131 is implemented is a separate component and is attached to the side surface of the first frame carrier 31, or, the second friction actuating portion 132 is designed as a separate component and is attached to the side surface of the second frame carrier 32. For another example, the first friction actuating portion 131 is designed as a coating coated on the side surface of the first frame carrier 31, or the second friction actuating portion 132 is designed as a coating coated on the side surface of the second frame carrier 32. It should be understood that, in other examples of the present disclosure, the first friction actuating portion 131 may also be integrally formed on the surface of the outer side wall of the first frame carrier 31, that is, the first friction actuating portion 131 and the first frame carrier 31 has an integrated structure. Of course, in other examples of the present disclosure, the second friction actuating portion 132 may also be integrally formed on the surface of the outer side wall of the second frame carrier 32, that is, the second friction actuating portion 132 and the second frame carrier 32 has an integrated structure.

Further, as shown in FIGS. 9 and 11A to 11C, in the embodiment of the present disclosure, the first frame carrier 31 has a first groove 310 recessedly formed on its surface, and the first friction actuating portion 131 is arranged in the first groove 310. Preferably, the shape and size of the first friction actuating portion 131 are adapted to those of the first groove 310, so that the first friction actuating portion 131 can be fittingly embedded into the first groove 310. Likewise, the second frame carrier 32 has a second groove 320 recessedly formed on its surface, and the second friction actuating portion 132 is arranged in the first groove 320. Preferably, the shape and size of the second friction actuating portion 132 are adapted to those of the second groove 320, so that the second friction actuating portion 132 can be fittingly embedded into the second groove 320.

Figure 14:
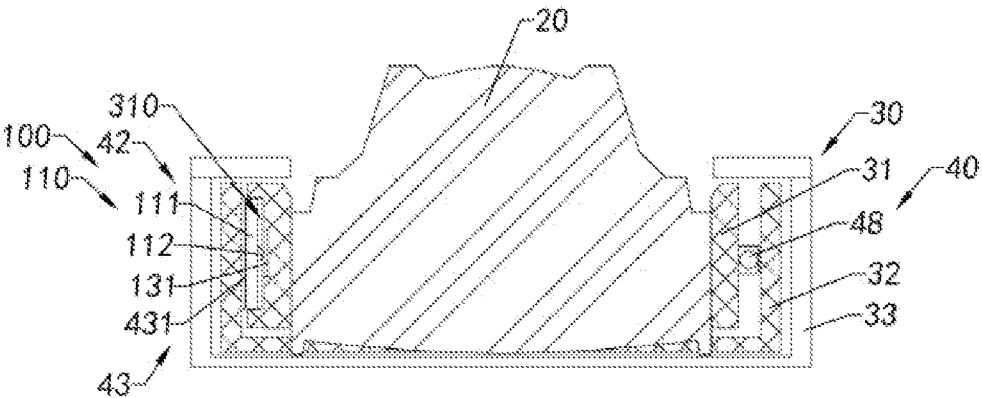
FIG. 14 illustrates a schematic view of another variant of the camera module according to the embodiment of the present disclosure.

FIG. 14 illustrates a schematic view of a variant of the camera module according to the embodiment of the present disclosure. Compared with the example illustrated in FIG. 9, as shown in FIG. 14, in this variant embodiment, the first groove 310 has a relatively larger size, so that the first driving element 42 can be partially accommodated in the first groove 310. More specifically, in this variant embodiment, the shape of the first groove 310 is adapted to the shape of the first driving element 42, and the piezoelectric plate structure 111 of the first driving element 42 is suitable for being at least partially accommodated in the first groove. Thus, when the first driving element 42 drives the first frame carrier 31 in the first groove 310, the first groove 310 itself forms a guiding groove for guiding the movement of the first driving element 42. That is, in this variant embodiment, the first groove 310 not only provides an installation space for the installation of the first driving element 42, but also forms itself a guiding groove for guiding the movement of the first driving element 42 (in other words, regulating the movement of the first driving element 42).

Correspondingly, in this variant embodiment, the second groove 320 has a relatively larger size, so that the second driving element 45 can be partially accommodated in the second groove 320. More clearly, in this variant embodiment, the shape of the second groove 320 is adapted to the shape of the second driving element 45, and the piezoelectric plate structure 111 of the second driving element 45 is suitable for being at least partially accommodated in the first groove. Thus, when the second driving element 45 drives the first frame carrier 31 in the second groove 320, the second groove 320 itself forms a guiding groove for guiding the movement of the second driving element 45. That is, in this variant embodiment, the second groove 320 not only provides an installation space for the installation of the second driving element 45, but also forms a guiding groove for guiding the movement of the second driving element 45 (in other words, regulating the movement of the second driving element 45).

Likewise, when the second driving element 45 drives the second frame carrier 32 in the second groove 320, the second groove 320 itself forms a guiding groove for guiding the movement of the second frame carrier 32. That is, in this variant embodiment, the second groove 320 not only provides an installation space for the installation of the second driving element 45, but also itself forms a guiding structure for guiding the movement of the second frame carrier 32 (in other words, regulating the movement of the second driving element 45).

FIG. 15 illustrates a schematic view of still another variant of the camera module according to the embodiment of the present disclosure. As shown in FIG. 15, in this variant embodiment, the first frame carrier 31 has a first groove 310 that is recessedly formed on its side surface and extends laterally, and the second frame carrier 32 has a second groove 320 that is recessedly formed on its side surface and extends laterally.

In particular, compared with the examples shown in FIGS. 9 and 15, in this variant embodiment, the shape and size configuration of the first groove 310 and the second groove 320 are adjusted. Specifically, the size and shape of the first groove 310 are configured so that the friction driving portion 112 of the first driving element 42 can be embedded into the first groove 310. Meanwhile, the size and shape configuration of the second groove 320 are configured so that the friction driving portion 112 of the second driving element 45 can be embedded into the second groove 451. That is, in this embodiment, the first groove 310 not only forms an accommodating groove for accommodating the first friction actuating portion 131, but also forms a guiding groove for guiding a friction driving portion 112 of the first driving element 42; and the second groove 320 not only forms an accommodating groove for accommodating the second friction actuating portion 132, but also forms a guiding groove for guiding the friction driving portion 112 of the second driving element 45.

Moreover, in this variant embodiment, the first groove 441 has a reduced opening size, and/or, the second groove 320 has a reduced opening size. That is, in this variant embodiment, the opening size of the first groove 310 gradually decreases along the width direction of the first frame carrier 31 toward the direction away from the first driving element 42, and the opening size of the second groove 45 gradually decreases along the width direction of the second frame carrier 32 toward the direction away from the second driving element 45.

It should be understood that after the first driving element 42 and the second driving element 45 operate for a period of time, the friction driving portions 112 of the first driving element 42 and the second driving element 45 may wear out. Correspondingly, under the action of the first prepressing component 43 and the second prepressing component 46, the friction driving portion 112 of the first driving element 42 may extend further inwards to the first groove 310, the friction driving portion 112 of the second driving element 45 may extend further inwards to the second groove 320. Thus, since the first groove 310 has the reduced opening size and the second groove 320 has the reduced opening size, the friction driving portion 112 of the first driving element 42 can again be abutted against the first friction actuating portion 131 arranged in the first groove 310, and the friction driving portion 112 of the second driving element 45 can again be abutted against the second friction actuating portion 132 arranged in the second groove 320. In this way, the service life of the first driving element 42 and the second driving element 45 can be extended, that is, the service life of the camera module can be extended.

Figure 16:
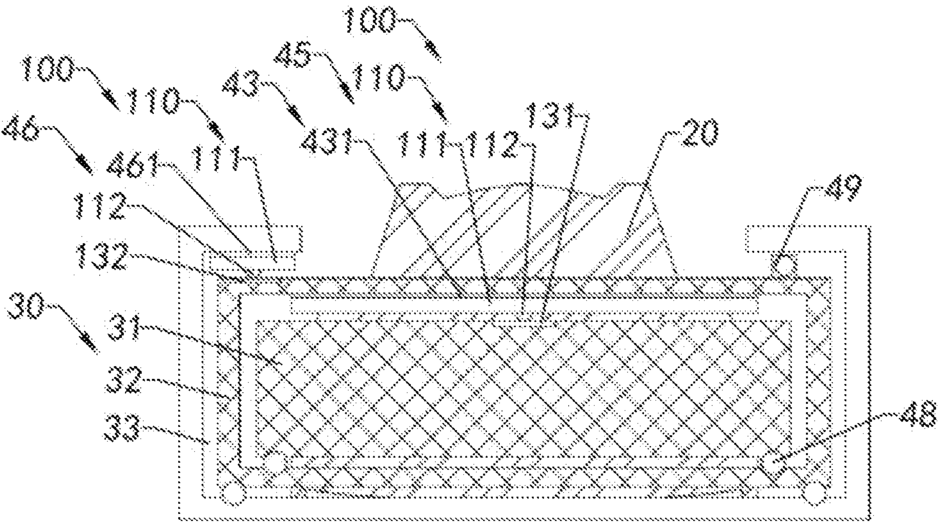
FIG. 16 illustrates a schematic view of still another variant of the camera module according to the embodiment of the present disclosure.

FIG. 16 illustrates a schematic view of still another variant of the camera module according to the embodiment of the present disclosure. Compared with the example illustrated in FIG. 9, in this variant embodiment, the arrangement of the first driving element 42 and the second driving element 45 is adjusted.

Specifically, in the example illustrated in FIG. 9, the first driving element 42 is located on the side part of the first frame carrier 31, and the second driving element 45 is located on the side part of the second frame carrier 32. In contrast, as shown in FIG. 16, in this variant embodiment, the first driving element 42 is located on the upper part of the first frame carrier 31, and the second driving element 45 is located on the upper part of the second frame carrier 32.

In a specific example of this variant, the first driving element 42 is sandwiched between the first frame carrier 31 and the second frame carrier 32 up and down through the first prepressing component 43. In this way, the first driving element 42 is frictionally coupled to the first frame carrier 31. The second driving element 45 is sandwiched between the second frame carrier 32 and the outer frame carrier 33 up and down through the second prepressing component 46. In this way, the second driving element 45 is frictionally coupled to the second frame carrier 32.

Correspondingly, the driving assembly 40 further includes a first guiding mechanism 48 arranged between the first frame carrier 31 and the second frame carrier 32, and a second guiding mechanism 49 arranged between the second frame carrier 32 and the outer frame carrier 33. However, unlike the example illustrated in FIGS. 10 and 15, in this variant embodiment, the first guiding mechanism 48 and the second guiding mechanism 49 are designed as a rolling ball-rolling groove mechanism, as shown in FIG. 16.

Figure 17:
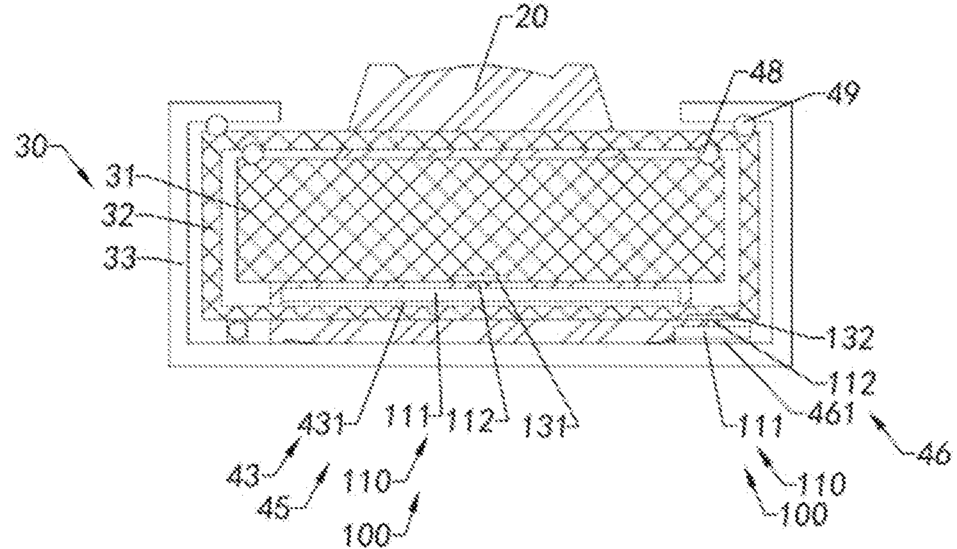
FIG. 17 illustrates a schematic view of still another variant of the camera module according to the embodiment of the present disclosure.

FIG. 17 illustrates a schematic view of still another variant of the camera module according to the embodiment of the present disclosure. Compared with the example illustrated in FIG. 9, in this variant embodiment, the arrangement of the first driving element 42 and the second driving element 45 is adjusted again.

Specifically, as shown in FIG. 17, in this variant embodiment, the first driving element 42 is located on the lower part of the first frame carrier 31, and the second driving element 45 is located on the lower part of the second frame carrier 32.

In a specific example of this variant, the first driving element 42 is sandwiched between the first frame carrier 31 and the second frame carrier 32 up and down through the first prepressing component 43. In this way, the first driving element 42 is frictionally coupled to the first frame carrier 31. The second driving element 45 is sandwiched between the second frame carrier 32 and the outer frame carrier 33 up and down through the second prepressing component 46. In this way, the second driving element 45 is frictionally coupled to the second frame carrier 32.

Correspondingly, the driving assembly 40 further includes a first guiding mechanism 48 arranged between the first frame carrier 31 and the second frame carrier 32, and a second guiding mechanism 49 arranged between the second frame carrier 32 and the outer frame carrier 33. However, unlike the example illustrated in FIGS. 11 and 15, in this variant embodiment, the first guiding mechanism 48 and the second guiding mechanism 49 are designed as a rolling ball-rolling groove mechanism, as shown in FIG. 17.

In summary, the camera module based on the embodiment of the present disclosure is explained, wherein the camera module adopts the piezoelectric actuator 100 as a driver, which can not only meet the driving requirements of the camera module for optical performance adjustment, but also meet the development demands of the camera module for lightness and thinness.

Although the camera module is a traditional upright camera module as an example in the embodiment of the present disclosure, it should be understood by those of ordinary skill in the art that the piezoelectric actuator 100 according to the embodiment of the present disclosure may also be used as a driver in a periscope camera module, which is not limited in the present disclosure.

It should be understood by those skilled in the art that the embodiments of the present disclosure shown in the above description and the drawings are only used as examples and do not limit the present disclosure. The objects of the present invention have been fully and effectively achieved. The functional and structural principles of the present disclosure have been shown and described in the embodiments, and the implementations of the present disclosure may be changed or modified in any way without departing from the principles.

What is claimed is:

1. A camera module, comprising:

a photosensitive assembly, comprising a circuit board and a photosensitive chip electrically connected to the circuit board;

a frame carrier assembly mounted on the photosensitive assembly, wherein the frame carrier assembly comprises a first frame carrier, a second frame carrier externally arranged on the first frame carrier and an outer frame carrier externally arranged on the second frame carrier;

an optical camera lens held on a photosensitive path of the photosensitive assembly by being mounted in the first frame carrier, wherein the optical camera lens is provided with an optical axis; and a driving assembly, comprising a first driving element, a first prepressing component, a second driving element and a second prepressing component; wherein the first driving element is frictionally coupled to the first frame carrier through the first prepressing component, and is configured to, after being driven, move in a two-dimensional trajectory in a plane perpendicular to the optical axis in a manner of bending vibration along two directions, and thereby drive the first frame carrier by friction, so as to bring the optical camera lens to move in a first direction perpendicular to the optical axis;

wherein the second driving element is frictionally coupled to the second frame carrier through the second prepressing component, and is configured to, after being driven, move in a two-dimensional trajectory in a plane perpendicular to the optical axis in a manner of bending vibration along two directions, and thereby drive the second frame carrier by friction, so as to bring the first frame carrier to bring the optical camera lens to move in a second direction perpendicular to the optical axis, the second direction being perpendicular to the first direction;

wherein the first driving element and the second driving element are each designed as a piezoelectric actuator, and each said piezoelectric actuator comprises an actuating system and a driving circuit system, wherein the actuating system of each said piezoelectric actuator moves in a two-dimensional trajectory along a preset direction in a manner of bending vibration along two directions under the control of the respective driving circuit system;

wherein the actuating system of each said piezoelectric actuator comprises a piezoelectric plate structure and a friction driving portion fixed to the piezoelectric plate structure, and the friction driving portion of the first driving element is frictionally coupled to the first frame carrier and the friction driving portion of the second driving element is frictionally coupled to the second frame carrier; and wherein the piezoelectric plate structure of each said piezoelectric actuator has a first side surface extending along its depth direction and a second side surface extending along its height direction and adjacent to the first side surface, wherein the piezoelectric plate structure has a first resonance frequency along its depth direction and a second resonance frequency along its height direction, and wherein the second resonance frequency is greater than the first resonance frequency.

2. The camera module according to claim 1, wherein each said piezoelectric plate structure comprises a first piezoelectric region, a second piezoelectric region and a third piezoelectric region formed on the second side surface, and a fourth piezoelectric region formed on the first side surface, wherein the second piezoelectric region is located between the first piezoelectric region and the third piezoelectric region, and the fourth piezoelectric region is adjacent to the second piezoelectric region; and wherein each said piezoelectric plate structure further comprises a first electrode pair electrically connected to the first piezoelectric region, a second electrode pair electrically connected to the second piezoelectric region, a third electrode pair electrically connected to the third piezoelectric region, and a fourth electrode pair electrically connected to the fourth electrical connection region.

3. The camera module according to claim 2, wherein each said driving circuit system comprises a first driving circuit and a second driving circuit, the first driving circuit is electrically connected to the first electrode pair and the third electrode pair, and the second driving circuit is electrically connected to the second electrode pair and the fourth electrode pair; and wherein vibration frequencies of circuit vibration signals output by the first driving circuit and the second driving circuit are equal to the first resonance frequency or the second resonance frequency.

4. The camera module according to claim 3, wherein when the vibration frequency of the circuit vibration signal output by the first driving circuit is the first resonance frequency, the respective piezoelectric plate structure resonates in its height direction and partially resonates in its depth direction, so that the respective piezoelectric plate structure moves in a two-dimensional trajectory along a preset direction in a manner of bending vibration along two directions; and wherein when a vibration frequency of a circuit vibration signal output by the second driving circuit is the second resonance frequency, the respective piezoelectric plate structure resonates in its depth direction and partially resonates in its height direction, so that the respective piezoelectric plate structure moves in a two-dimensional trajectory along a preset direction in a manner of bending vibration along two directions.

5. The camera module according to claim 4, wherein the driving assembly further comprises a first friction actuating portion and a second friction actuating portion, and the first friction actuating portion is sandwiched between the friction driving portion of the first driving element and the first frame carrier, so that the first driving element is frictionally coupled to the first frame carrier through the first friction actuating portion and the first prepressing component; and the second friction actuating portion is sandwiched between the friction driving portion of the second driving element and the second frame carrier, so that the second driving element is frictionally coupled to the second frame carrier through the second prepressing component and the second friction actuating portion.

6. The camera module according to claim 5, wherein the first driving element is located on a side part of the first frame carrier, wherein the second driving element is sandwiched between the second frame carrier and the outer frame carrier through the second prepressing component and the second friction actuating portion, so that the second driving element is frictionally coupled to the second frame carrier, and wherein the second driving element is located on a side part of the second frame carrier.

7. The camera module according to claim 5, wherein the first driving element is located on an upper part of the first frame carrier, wherein the second driving element is sandwiched between the second frame carrier and the outer frame carrier through the second prepressing component and the second friction actuating portion, so that the second driving element is frictionally coupled to the second frame carrier, and wherein the second driving element is located on an upper part of the second frame carrier.

8. The camera module according to claim 5, wherein the first driving element is located on a lower part of the first frame carrier, wherein the driving assembly further comprises an outer frame carrier externally arranged on the second frame carrier, wherein the second driving element is sandwiched between the second frame carrier and the outer frame carrier through the second prepressing component and the second friction actuating portion, so that the second driving element is frictionally coupled to the second frame carrier, and wherein the second driving element is located on a low part of the second frame carrier.

9. The camera module according to claim 6, wherein the first prepressing component comprises a first elastic element, and the first elastic element is arranged between the piezoelectric plate structure of the first driving element and the second frame carrier, so as to force the friction driving portion of the first driving element to be abutted against the first friction actuating portion by means of an elastic force of the first elastic element, so that the first driving element is frictionally coupled to the first frame carrier; and the second prepressing element comprises a second elastic element, and the second elastic element is arranged between the piezoelectric plate structure of the second driving element and the outer frame carrier, so as to force the friction driving portion of the second driving element to be abutted against the second friction actuating portion by means of an elastic force of the second elastic element, so that the second driving element is frictionally coupled to the second frame carrier.

10. The camera module according to claim 7, wherein the first prepressing component comprises a first elastic element, and the first elastic element is arranged between the piezoelectric plate structure of the first driving element and the second frame carrier, so as to force the friction driving portion of the first driving element to be abutted against the first friction actuating portion by means of an elastic force of the first elastic element, so that the first driving element is frictionally coupled to the first frame carrier; and the second prepressing element comprises a second elastic element, and the second elastic element is arranged between the piezoelectric plate structure of the second driving element and the lens carrier, so as to force the friction driving portion of the second driving element to be abutted against the second friction actuating portion by means of an elastic force of the second elastic element, so that the second driving element is frictionally coupled to the second frame carrier.

11. The camera module according to claim 8, wherein the first prepressing component comprises a first elastic element, and the first elastic element is arranged between the piezoelectric plate structure of the first driving element and the second frame carrier, so as to force the friction driving portion of the first driving element to be abutted against the first friction actuating portion by means of an elastic force of the first elastic element, so that the first driving element is frictionally coupled to the first frame carrier; and the second prepressing element comprises a second elastic element, and the second elastic element is arranged between the piezo-electric plate structure of the second driving element and the outer frame carrier, so as to force the friction driving portion of the second driving element to be abutted against the second friction actuating portion by means of an elastic force of the second elastic element, so that the second driving element is frictionally coupled to the second frame carrier.

12. The camera module according to claim 9, wherein the first elastic element and the second elastic element are designed as adhesives having elasticity, wherein thickness dimensions of the first elastic element and the second elastic element are between 10 um and 50 um.

13. The camera module according to claim 8, wherein the first prepressing component comprises a first magnetic attraction element arranged on the first frame carrier and a second magnetic attraction element arranged on the second frame carrier and corresponding to the first magnetic attraction element, so as to force the friction driving portion of the first driving element to be abutted against the first friction actuating portion by means of a magnetic attraction effect between the first magnetic attraction element and the second magnetic attraction element, so that the first driving element is frictionally coupled to the first frame carrier; and the second prepressing component comprises a third magnetic attraction element arranged on the second frame carrier and a fourth magnetic attraction element arranged on the outer frame carrier and corresponding to the third magnetic attraction element, so as to force the friction driving portion of the second driving element to be abutted against the second friction actuating portion by means of a magnetic attraction effect between the third magnetic attraction element and the fourth magnetic attraction element, so that the second driving element is frictionally coupled to the second frame carrier.

14. The camera module according to claim 5, wherein the first frame carrier comprises a first groove recessedly formed on its surface, and the first friction actuating portion is arranged in the first groove, wherein the first groove forms a guiding groove for guiding the first driving element, wherein the second frame carrier comprises a second groove recessedly formed on its surface, and the second friction actuating portion is arranged in the second groove, wherein the second groove forms a guiding groove for guiding the second driving element.

15. The camera module according to claim 14, wherein at least one of the first groove and the second groove has a reduced opening size.

16. The camera module according to claim 5, wherein the driving assembly further comprises a first guiding mechanism arranged between the first frame carrier and the second frame carrier, and a second guiding mechanism arranged between the second frame carrier and the outer frame carrier.

* * * * *